(12) United States Patent
Tal et al.

(10) Patent No.: US 11,789,917 B2
(45) Date of Patent: Oct. 17, 2023

(54) DATA DEDUPLICATION IN A STORAGE SYSTEM

(71) Applicant: Dell Products L.P., Round Rock, TX (US)

(72) Inventors: Doron Tal, Geva Carmel (IL); Yosef Shatsky, Karnei Shomron (IL)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 17/583,365

(22) Filed: Jan. 25, 2022

(65) Prior Publication Data

US 2023/0237029 A1 Jul. 27, 2023

(51) Int. Cl.
*G06F 16/215* (2019.01)
*G06F 16/22* (2019.01)

(52) U.S. Cl.
CPC ........ *G06F 16/215* (2019.01); *G06F 16/2246* (2019.01)

(58) Field of Classification Search
CPC ............................. G06F 16/215; G06F 16/2246
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |
| 9,514,014 B2 | 12/2016 | Webman et al. |

(Continued)

FOREIGN PATENT DOCUMENTS

| | | |
|---|---|---|
| WO | 2015108670 A1 | 7/2015 |
| WO | PCT/US2019/024885 | 1/2020 |

(Continued)

OTHER PUBLICATIONS

Dell EMC, "Dell EMC VxRack FLEX," Dell EMC Product Overview, 2018, 5 pages.

(Continued)

*Primary Examiner* — Huawen A Peng
(74) *Attorney, Agent, or Firm* — Ryan, Mason & Lewis, LLP

(57) ABSTRACT

A storage control system receives a first data block to be written to a primary storage, and generates a content signature for the first data block. The storage control system adds a first entry for the first data block into a persistent deduplication database. The first entry comprises a key which comprises the content signature for the first data block. The persistent deduplication database comprises a tree data structure which comprises elements that are configured to store entries for data blocks. The storage control system merges the entries of at least two elements of the tree data structure to generate a set of merged entries which comprises the first entry for the first data block, and a second entry for a second data block, and commences a deduplication process in response to determining that the first entry and the second entry in the set of merged entries have matching keys.

20 Claims, 9 Drawing Sheets

(56) References Cited

U.S. PATENT DOCUMENTS

| | | | |
|---|---|---|---|
| 9,892,045 | B1 | 2/2018 | Douglis et al. |
| 9,983,822 | B1* | 5/2018 | Karr ................... G06F 3/0611 |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,093,464 | B1* | 8/2021 | Wang ................. G06F 16/2255 |
| 11,119,668 | B1 | 9/2021 | Keller et al. |
| 11,144,399 | B1 | 10/2021 | Yarimi et al. |
| 11,151,056 | B2* | 10/2021 | Shveidel ............. G06F 3/0665 |
| 11,163,479 | B2 | 11/2021 | Lieblich et al. |
| 11,163,699 | B2 | 11/2021 | Keller et al. |
| 11,436,344 | B1* | 9/2022 | Juch ...................... G06F 21/602 |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2011/0246741 | A1* | 10/2011 | Raymond ............ G06F 16/137 |
| | | | 711/170 |
| 2013/0305002 | A1 | 11/2013 | Hallak et al. |
| 2014/0143213 | A1* | 5/2014 | Tal ..................... G06F 16/2272 |
| | | | 707/692 |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0099810 | A1* | 4/2016 | Li .......................... H04L 9/3242 |
| | | | 713/193 |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0292995 | A1* | 10/2018 | Tal ....................... G06F 3/0641 |
| 2018/0300075 | A1 | 10/2018 | Fernandez et al. |
| 2019/0108238 | A1* | 4/2019 | Somers .............. G06F 16/1748 |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0271763 | A1* | 9/2021 | Perlman ................ G06F 21/602 |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex, " Version 3.5.x, Rev. 02, Jan. 2021, 66 pages.

U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."

U.S. Appl. No. 17/065,754 filed in the name of Dan Aharoni et al. filed Oct. 8, 2020, and entitled "Direct Response to IO Request in Storage System with Remote Replication."

U.S. Appl. No. 17/070,073 filed in the name of Dan Aharoni et al. filed Oct. 14, 2020, and entitled "Direct Response to IO Request in Storage System Having an Intermediary Target Apparatus."

U.S. Appl. No. 17/070,288 filed in the name of Anurag Sharma et al. filed Oct. 14, 2020, and entitled "Pipeline-Based System for Configuration Checking and Reporting Associated with an Information Processing System."

U.S. Appl. No. 17/071,407 filed in the name of John Moran et al. filed Oct. 15, 2020, and entitled "Dynamic Remediation Actions in Response to Configuration Checks in an Information Processing System."

U.S. Appl. No. 17/077,105 filed in the name of Yosef Shatsky et al. filed Oct. 22, 2020, and entitled "Volume Tiering in Storage Systems."

U.S. Appl. No. 17/106,988 filed in the name of Rivka Matosevich et al. filed Nov. 30, 2020, and entitled "Managing Host Connectivity to a Data Storage System."

U.S. Appl. No. 17/123,525 filed in the name of Itay Keller et al. filed Dec. 16, 2020, and entitled "Deferred Reclamation of Invalidated Entries Associated with Replication in a Log-Structured Array."

U.S. Appl. No. 17/145,646 filed in the name of Yosef Shatsky et al. filed Jan. 11, 2021, and entitled "Redistribution of Processing Groups between Server Nodes Based on Hardware Resource Utilization."

U.S. Appl. No. 17/232,203 filed in the name of Roman Spiegelman filed Apr. 16, 2021, and entitled "Object Synchronization of Server Nodes in a Network Computing Environment."

U.S. Appl. No. 17/236,256 filed in the name of Doron Tal et al. filed Apr. 21, 2021, and entitled "Recovery from Partial Device Error in Data Storage System."

U.S. Appl. No. 17/306,601 filed in the name of Rivka Matosevich et al. filed May 3, 2021, and entitled "Managing Replication Journal in a Distributed Replication System."

U.S. Appl. No. 17/308,166 filed in the name of Adi Bar Shalom et al. filed May 5, 2021, and entitled "Journal Barrier Consistency Determination."

U.S. Appl. No. 17/351,733 filed in the name of Yosef Shatsky et al. filed Jun. 18, 2021, and entitled "Data Deduplication in a Disaggregated Storage System."

U.S. Appl. No. 17/361,666 filed in the name of Yosef Shatsky et al. filed Jun. 29, 2021, and entitled "Tracking Utilization of Data Blocks in a Storage System."

U.S. Appl. No. 17/511,695 filed in the name of Yosef Shatsky et al. filed Oct. 27, 2021, and entitled "Write Cache Management."

(56) References Cited

OTHER PUBLICATIONS

U.S. Appl. No. 17/511,699 filed in the name of Yosef Shatsky et al. filed Oct. 27, 2021, and entitled "Metadata Management in Storage Systems."
U.S. Appl. No. 17/512,890 filed in the name of Yosef Shatsky et al. filed Oct. 28, 2021, and entitled "Utilizing Checkpoints for Resiliency of Metadata in Storage Systems."
U.S. Appl. No. 17/569,198 filed in the name of Yosef Shatsky filed Jan. 5, 2022, and entitled "Utilizing a Persistent Write Cache as a Redo Log."

* cited by examiner

700

DATA DEDUPLICATION IN A STORAGE SYSTEM

TECHNICAL FIELD

This disclosure relates generally to data storage management techniques and, in particular, to techniques for implementing data deduplication in a storage system.

BACKGROUND

Data deduplication is a common method that is implemented to reduce the amount of data in a storage system. In general, data deduplication involves discovering and removing duplicate data, wherein a deduplication operation takes place when the same block of data or file is written to multiple locations of the storage system. Such locations may be cross-volume and/or cross-node depending on the implementation. The process of removing duplicate data generally includes replacing the duplicate data with a reference (e.g., pointer) to a single instance of the data, thereby reducing the amount of stored data. There are various types of data deduplication techniques which identify and eliminate redundant data using different algorithms, all of which require some level of overhead to discover and remove the duplicate data, which can impact storage system performance. In this regard, data deduplication should be implemented in a way that minimizes such overhead to thereby minimize the impact on storage system performance.

SUMMARY

Exemplary embodiments of the disclosure include techniques for implementing data deduplication in a storage system. For example, an exemplary embodiment includes a method performed by a storage control system. The storage control system receives a first data block to be written to a primary storage, and generates a content signature for the first data block. The storage control system adds a first entry for the first data block into a persistent deduplication database. The first entry for the first data block comprises a key which comprises the content signature for the first data block. The persistent deduplication database comprises a tree data structure which comprises elements that are configured to store entries for data blocks. The storage control system merges the entries of at least two elements of the tree data structure to generate a set of merged entries which comprises the first entry for the first data block, and a second entry for a second data block, and commences a deduplication process in response to determining that the first entry and the second entry in the set of merged entries have matching keys.

Other embodiments of the disclosure include, without limitation, systems and articles of manufacture comprising processor-readable storage media, which are configured to implement data deduplication in a storage system.

DETAILED DESCRIPTION

Exemplary embodiments of the disclosure will now be discussed in further detail with regard to systems and methods for performing data deduplication in a storage system. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
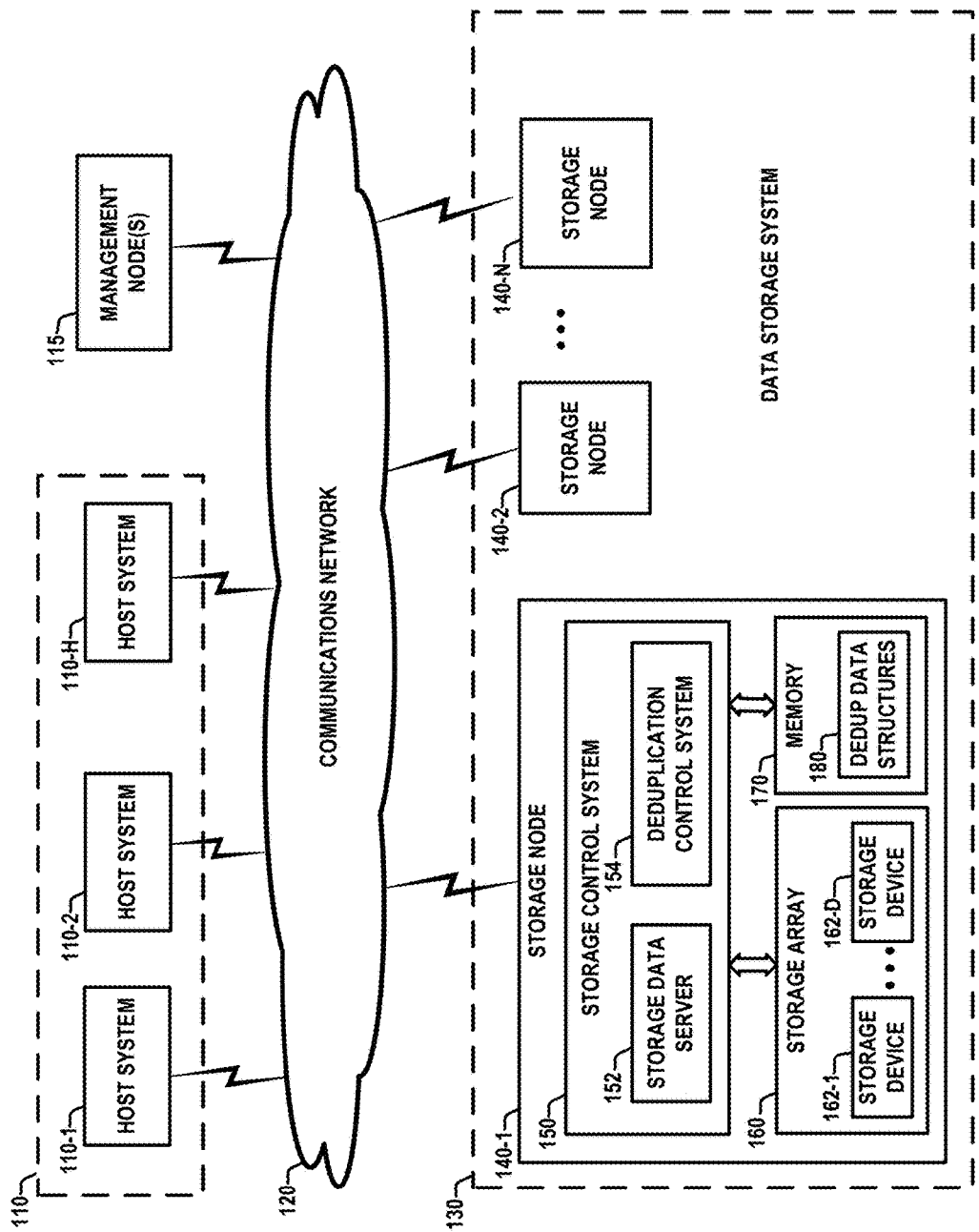
FIG. 1 schematically illustrates a network computing system comprising a storage system which implements a data deduplication system, according to an exemplary embodiment of the disclosure.

FIG. 1 schematically illustrates a network computing system 100 comprising a storage system which implements a data deduplication system, according to an exemplary embodiment of the disclosure. The network computing system 100 comprises one or more host systems 110-1, 110-2, . . . 110-H (collectively, host systems 110), one or more management nodes 115, a communications network 120, and a data storage system 130. The data storage system 130 comprises one or more storage nodes 140-1, 140-2, . . . , 140-N (collectively, storage nodes 140). As shown in FIG. 1, the storage node 140-1 comprises a storage control system 150, a storage array 160 comprising a plurality of storage devices 162-1, . . . , 162-D (collectively, storage devices 162), and primary memory 170 (alternatively, system memory 170). In some embodiments, the primary memory 170 comprises volatile random-access memory (RAM) and non-volatile RAM (NVRAM). In some embodiments, the other storage nodes 140-2 . . . 140-N have the same or similar configuration as the storage node 140-1 shown in FIG. 1. The storage control system 150 comprises a storage data server 152, and a data deduplication control system 154. The data deduplication control system 154 generates, maintains, and utilizes a plurality of deduplication data structures 180, which in some embodiments, are maintained in persistent memory of the primary memory 170, the functions of which will be described in further detail below.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. In some embodiments, the host systems 110 include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement input/output (I/O) channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 1000, shown in FIG. 10) which comprise processors and system memory, and host virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprises storage nodes, which are separate from the storage control nodes. In such a configuration, the storage control systems 150 are configured to handle the processing of data associated with data access requests (i.e., I/O read and write requests), and the storage arrays 160 are configured to handle writing/reading data to/from respective storage devices 162. In a disaggregated architecture, each storage control system 150 would be configured to directly access data stored in each storage array 160 in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of each storage node 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage control systems 150 and the storage arrays 160 are interconnected in a full-mesh network, wherein back-end interconnectivity is achieved using, e.g., a redundant high-speed storage fabric, wherein the storage control systems 150 can utilize remote procedure calls (RPC) for control messages and remote direct memory access (RDMA) for accessing data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

In some embodiments, as noted above, the primary memory 170 comprises volatile RAM such as dynamic RAM (DRAM), synchronous DRAM (SDRAM), etc. In addition, the primary memory 170 comprises non-volatile memory which is configured as RAM. In this regard, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express (PCIe)) using a suitable interface such as non-volatile memory express (NVMe).

The data deduplication control systems 154 of the storage nodes 140 are configured to perform data deduplication operations to reduce duplicate/redundant data that is stored in the storage arrays 160 of the data storage system 130. In some embodiments, each data deduplication control system 154 is configured to perform a combination of "semi-inline" deduplication and "semi post-process" deduplication. In particular, in some embodiments, a "semi-inline" deduplication process is performed by utilizing an in-RAM cache of common content signatures to perform inline identification of common duplicated data. Further, in some embodiments, a semi post-process deduplication comprises an efficient late deduplication identification process in which identification of potential duplicated data occurs in conjunction with an update of a persistent primary deduplication data structure. As explained in further detail below, the late deduplication identification process improves the cost of performing a post-process deduplication lookup process, as such process enables higher deduplication lookup rates on average without the associated performance impact. Exemplary systems and methods for performing data deduplication according to embodiments of the disclosure will now be discussed in further detail in conjunction with FIGS. 2-9.

Figure 2:
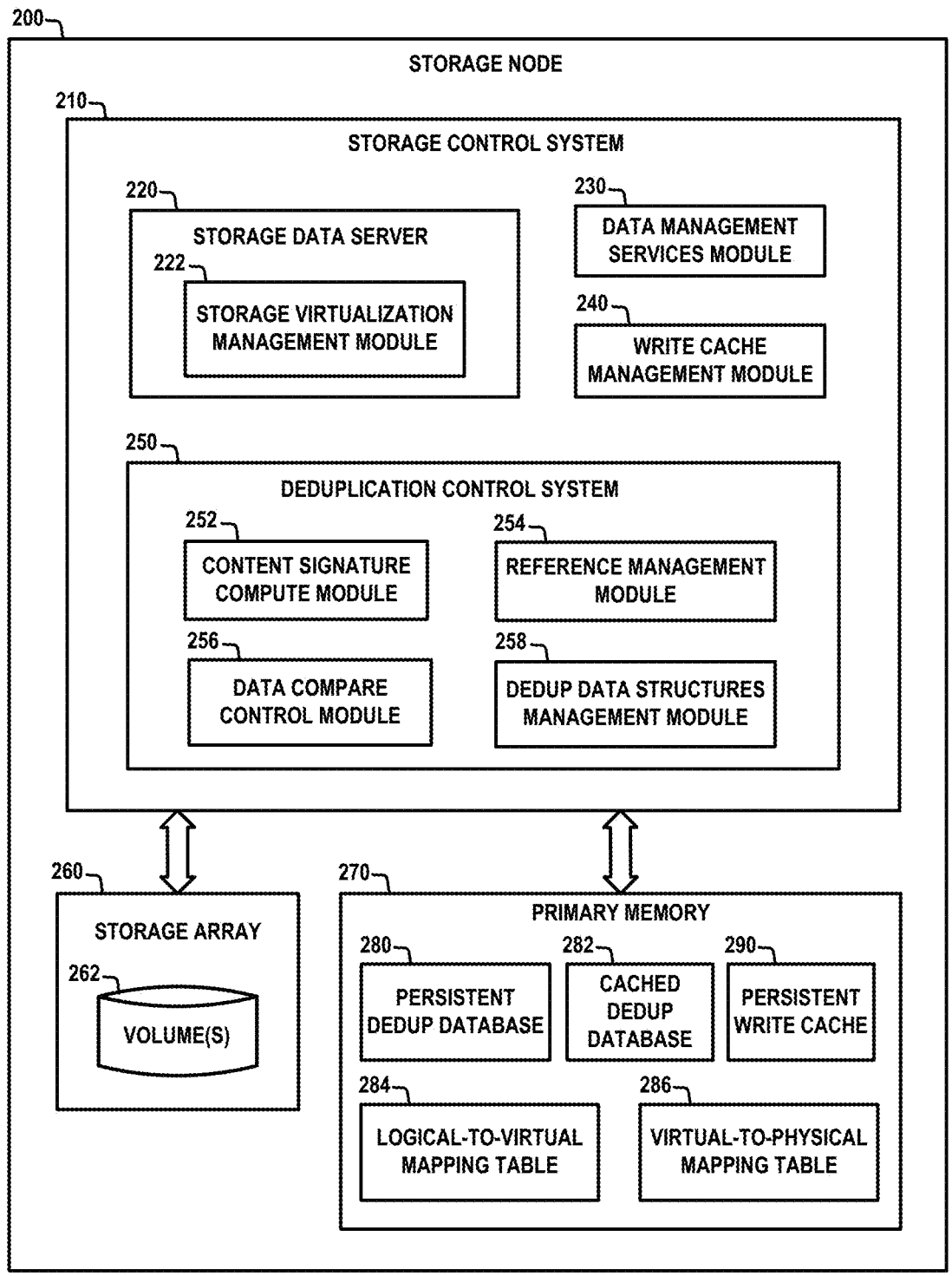
FIG. 2 schematically illustrates a storage node which implements a data deduplication system, according to an exemplary embodiment of the disclosure.

FIG. 2 schematically illustrates a storage node 200 which implements a data deduplication system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 230, a write cache management module 240, and a data deduplication control system 250. The storage data server 220 comprises a storage virtualization management module 222. The data deduplication control system 250 comprises various modules including, but not limited to, a content signature compute module 252, a reference management module 254, a data compare control module 256, and a deduplication data structures management module 258, the functions of which will be described in further detail below.

The storage node 200 further comprises a storage array 260 (comprising storage devices), and primary memory 270. The storage array 260 comprises storage capacity which is partitioned into one or more storage volumes 262. In some embodiments, the primary memory 270 comprises both non-volatile memory (e.g., SSD, PMEM, etc.) and volatile memory (e.g., DRAM). The primary memory 270 comprises a persistent deduplication database 280, an in-RAM cached deduplication database 282, a logical-to-virtual mapping table 284, a virtual-to-physical mapping table 286, and a persistent write cache 290. The persistent deduplication database 280, the in-RAM cached deduplication database 282, the logical-to-virtual mapping table 284, and the virtual-to-physical mapping table 286 comprise data structures that are provisioned and managed by the deduplication data structures management module 258, and utilized by the data deduplication control system 250 to perform data deduplication operations as discussed herein. In some embodiments, the in-RAM cached deduplication database 282 is maintained in volatile RAM of the primary memory 270, and the persistent deduplication database 280, the logical-to-virtual mapping table 284, and the virtual-to-physical mapping table 286 comprise persistent data structures which reside in respective regions of non-volatile RAM (e.g., PMEM memory, SSD memory, etc.), which are allocated for such persistent data structures. In other embodiments, such persistent data structures reside in respective allocated regions of storage in the storage array 260.

The persistent write cache 290 is provisioned in the primary memory 270 and managed by the write cache management module 240. The persistent write cache 290 serves a dual purpose of reducing write latency, and in some circumstances, reducing the overhead associated with data deduplication. In particular, in some embodiments, when processing I/O write operations, the write cache management module 240 writes data items and associated metadata to the persistent write cache 290, which allows the I/O write data to be persisted with minimal delay and allows the storage control system 210 to return an acknowledgement to the host system before the I/O write data is actually written to physical storage in the storage array 260. Since writes to the persistent write cache 290 are acknowledged to the host system, the persistent write cache 290 is utilized to serve I/O read requests for data stored in the persistent write cache 290, but not yet written to primary storage (e.g., storage array 260). In some embodiments, a write cache lookup data structure is implemented in volatile RAM, or in NVM to enable read access to data that is stored in the persistent write cache 290. In some embodiments, the write cache 290 resides in a region of non-volatile RAM (e.g., PMEM memory, SSD memory, etc.), which is allocated for the persistent write cache 290. In other embodiments, the persistent write cache 290 resides in an allocated region of storage in the storage array 260.

The storage data server 220 implements functions as discussed above such as processing I/O write and read requests received from host systems to write/read data to/from the storage array 260. The storage virtualization management module 222 implements any suitable logical volume management system which is configured to create and manage the storage volume(s) 262 by aggregating the capacity of the storage array 260 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data.

The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage array 260) and presents logical (virtualized) addresses to users in the form of LUNs, the storage data server 220 generates and manages metadata to provide mapping between logical addresses and physical addresses. In addition, the storage control system 210 generates and manages metadata which is utilized for managing snapshots, tracking remote replication, managing deduplication pointers, managing data compression, resiliency related metadata (e.g., RAID), etc.

The write cache management module 240 implements methods that are configured to provision and manage the persistent write cache 290. For example, the write cache management module 240 implements methods to store data items and associated metadata items in the persistent write cache 290 according to a suitable cache data placement scheme. In addition, the write cache management module 240 is configured to generate an acknowledgment message, which is returned to a calling application or host system after I/O write data is written to the persistent write cache 290. In addition, as noted above, write cache management module 240 is configured to read items from the persistent write cache 290 for purposes of servicing I/O read requests for data that is persisted in the persistent write cache 290, but not yet written to primary storage.

In addition, the write cache management module 240 implements methods that are configured to control the destaging of data items and metadata items from the write cache, wherein the destaged data items are stored to a primary data store, and the destaged metadata items are stored to a primary metadata structure. In some embodiments, the write cache destaging operations are configured to destage data items and destage metadata items separately, based on associated eviction/destaging policies, the details of which are implementation specific and are outside the scope of this disclosure. However, in the context of data deduplication, in some embodiments, the size of the persistent write cache 290 and the destaging policies for cached data items is optimized and controlled in a manner to mitigate the need to perform data destaging of data items or data chunks that already exist in primary storage as determined via the semi-inline deduplication or semi post-process deduplication operations as discussed herein. In other words, after acknowledging an I/O write, the storage control system can perform deduplication, and if successful, the destaging and writing of data chunks from the persistent write cache 290 to primary storage (e.g., an SSD or HDD tier) will be avoided. In this regard, the implementation of a relatively large in-RAM cache deduplication database and/or relatively large size persistent write cache (e.g., 2%) in the case or late deduplication, may not require writing the data more times as compared to semi-inline deduplication.

The data deduplication control system 250 is configured to control deduplication operations that are performed by the storage node 200. In some embodiments, the data deduplication control system 250 implements a block-level deduplication (or sub-file deduplication) scheme which is configured to compare data blocks (alternatively, data items, data chunks, or shards) to identify and eliminate duplicate data blocks. The block-level deduplication process eliminates duplicate/redundant data blocks that are the same, even when the files which contain the duplicate data blocks are not entirely identical. In some embodiments, a block-level deduplication scheme is implemented by dividing data (e.g., file) into fixed sized data blocks (e.g., 4 KB, 8 KB, etc.) and creating a unique content signature (e.g., hash value) for each unique data block. For example, assuming that data is divided into 8 KB chunks, a 16 KB file will be divided into two 8 KB data blocks, and an associated unique content signature will be generated for each of the two 8 KB data blocks.

The various modules of the data deduplication control system 250 implement functions to enable the storage control system 210 to perform deduplication operations. For example, the content signature compute module 252 implements methods that are configured to compute unique content signatures for data blocks. In some embodiments, the unique content signatures comprise unique hash values for data blocks. The unique hash values are computed using a suitable hashing algorithm, such as Secure Hash Algorithm (e.g., SHA-1, SHA-2, SHA-256), which is configured to create a cryptographic alpha-numeric value (referred to as a hash value) for a given data block.

Further, the reference management module 254 implements methods that are configured to enable the storage control system 210 (operating as, e.g., a referrer node) to generate and manage references to data blocks that are owned by other storage control nodes. For example, for a block-level deduplication scheme, when a match occurs between a given data block and an existing (stored) data block, the given data block is deemed to be a duplicate data bock (or redundant data block), and the duplicate data block is replaced with a reference that points to the stored data block. In addition, the reference management module 254 implements methods that are configured to maintain a reference count for each data block owned by the storage control system 210 (operating as, e.g., an owner node). The reference count for a given data block denotes a number of referrer nodes that hold a reference (e.g., pointer) to the given data block owned by the owner node. The reference count for a given data block allows the owner node to decide when it is safe to delete the given data block when the reference count is zero (0). Otherwise, if the reference count for a given data block is greater than zero, the owner node will not delete/release the data block, as the reference count greater than zero indicates that at least one other storage control node (referrer node) requires access to the data block.

The data compare control module 256 implements methods that are configured to enable a storage control node (operating as, e.g., a referrer node) to identify duplicate/redundant data blocks. More specifically, in embodiments where the data deduplication control system 250 implements block-level deduplication, the data compare control module 256 is configured to perform a byte-by-byte comparison between two data blocks to determine whether or not the two data blocks are duplicate data blocks.

Furthermore, as noted above, the deduplication data structures management module 258 implements methods that are configured to provision and manage the persistent deduplication database 280, the in-RAM cached deduplication database 282, the logical-to-virtual mapping table 284, and the virtual-to-physical mapping table 286. In some embodiments, the persistent deduplication database 280 comprises a persistent key-value (K-V) store which is configured to map unique content signatures (keys) of data blocks to respective unique virtual addresses (values) within the data storage system. In some embodiments, the persistent deduplication database 280 comprises a local persistent deduplication database 280 which comprises a subset of unique content signatures (e.g., hashes) of a global content signature space (e.g., hash space), which is assigned to the given storage node 200 to implement a distributed deduplication database across all or some of the storage nodes of the given storage system (e.g., storage nodes 140-1, 140-2, . . . , 140-N, FIG. 1).

Figure 3:
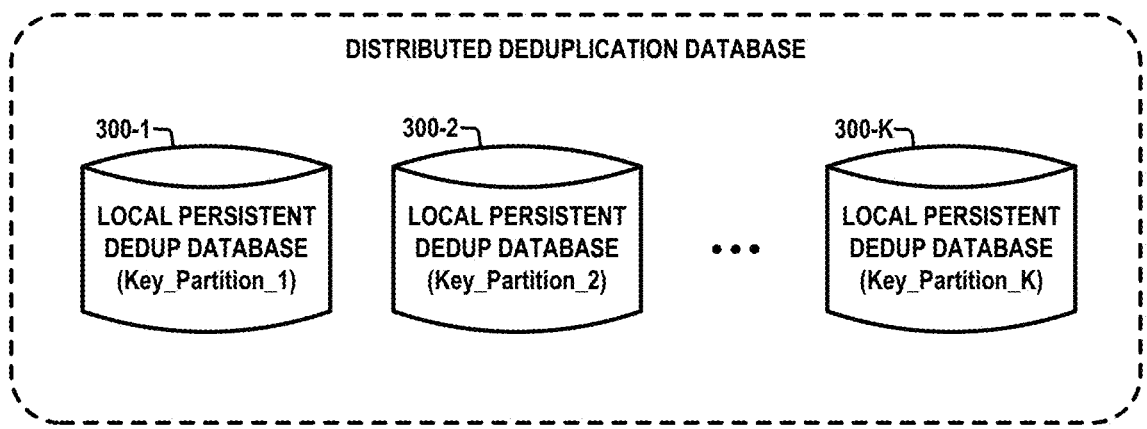
FIG. 3 schematically illustrates a distributed deduplication database, according to an exemplary embodiment of the disclosure.

For example, FIG. 3 schematically illustrates a distributed deduplication database 300, according to an exemplary embodiment of the disclosure. The distributed deduplication database 300 comprises a plurality of local persistent deduplication databases 300-1, 300-2, . . . , 300-K, which are distributed over multiple storage nodes. In some embodiments, a global deduplication database can be sharded (e.g., partitioned) across multiple storage nodes according to the content signature values (e.g., hash values) using known techniques such as consistent hashing. For example, in a consistent hashing architecture for deduplication, the content signature space (e.g., key space) is divided into a number of partitions, where each partition is handled by a storage node. As shown in FIG. 3, the content signature space (e.g., key space) is divided into a plurality (K) of partitions, Key_Partition_1, Key_Partition_2, . . . , Key_Partition_K, which are maintained in respective local persistent deduplication databases 300-1, 300-2, . . . , 300-K. In some embodiment, the number of key partitions equals the number of storage nodes in the storage system. In other embodiments, each storage node may be assigned two key partitions. The distributed deduplication database enables load balancing between multiple storage nodes for data deduplication.

In some embodiments, the persistent deduplication database 280 (or local deduplication lookup database) is implemented using a write-optimized data structure including, but not limited to, a log-structured merge (LSM) tree structure or a B-epsilon tree structure, to organize key:value pairs (content signature:virtual address) for data deduplication, and which provides a key-value API to enable blind update and blind inserts of entries into the tree data structure interests of elements, as well as querying the persistent deduplication database 280. When using such write-optimized data structures to implement a persistent deduplication database structure, inserts and updates are appended to a top level of the data structure and propagate towards a bottom level or leaf level of the data structure. Thus, multiple entries with the same key (e.g., content signature) may exist in the deduplication database tree structure at a given point in time.

As explained in further detail below, a late identification deduplication process is triggered when entries in the persistent deduplication database 280 (organized as an LSM tree or B-epsilon tree) having a same key (e.g., content signature) are merged. In this instance, a merge of two or more entries having a same key indicates that a potential deduplication has been identified. In such cases, instead of overwriting an old value with a new value, the storage node will initiate a deduplication process. With this process, the late identification of potential duplicated data is achieved naturally and on a continuous basis when, e.g., performing merging operations, of the LSM tree or B-epsilon tree data structure, without the need to initiate a post-process deduplication process at some point in time to perform a large-scale lookup operation on a global deduplication database to identify duplicated data, and perform post-process data deduplication operations to remove duplicated data.

The in-RAM cached deduplication database 282 comprises a read cache which maintains a set of "hot" content signatures associated with commonly accessed data blocks. More specifically, in some embodiments, the in-RAM cached deduplication database 282 stores key-value entries of the persistent deduplication database 280 which are accessed on a regular basis. In instances where access patterns are regular and provide locality, the in-RAM caching of portions of the persistent deduplication database 280 allow fast querying and read access to the cached deduplication entries, as opposed to querying and access the persistent deduplication database 280 in non-volatile memory or primary storage. In this regard, as explained in further detail below, the implementation of in-RAM cached deduplication database 282 enables implementation of semi-inline data deduplication in which inline deduplication can be performed if potential duplication data is identified by querying the in-RAM cached deduplication database 282.

In some embodiments, the content signatures that are stored in the persistent deduplication database 280 and in-RAM cached deduplication database 282 may comprise (i) strong signatures that are strong enough to allow deduplication of the data without performing byte-by-byte data comparison, or (ii) weak signatures that provide a strong hint that duplicate data that has likely been identified but requires further validation by, e.g., byte-by-byte data comparison. More specifically, in some embodiments, an entire computed hash value for each unique data block (e.g., long, strong hash value) is stored in the deduplication database. In this instance, when the data deduplication control system 250 finds a match between a computed hash value of a new data block with a unique hash value in the deduplication database, the data deduplication control system 250 can deem the new data block to be a duplicate (or most likely a duplicate) of an existing data block in the data storage system.

In other embodiments, to conserve system memory, a portion of the computed hash value (e.g., partial hash value) for each unique data block is stored in the deduplication database. The partial hash values are sufficient to enable the data deduplication control system 250 to compare a computed hash value of a new data block with the partial hash values in the deduplication database to determine whether or not the computed hash value matches a given partial hash value. In this instance, when the data deduplication control system 250 finds a match between a computed hash value of a new data block with a unique partial hash value in the global hash database, the data deduplication control system 250 can deem the new data block to be a potential duplicate of an existing data block in the data storage system, and will utilize the matching partial hash value to determine a location of the existing data block associated with the partial hash value.

The logical-to-virtual mapping table 284 comprises a mapping data structure which maps a given logical address space (e.g., volume/offset space) to a virtual address space. The logical address space is the space that host applications and operating systems use to access data in the storage system. A logical address space for a given volume can be partitioned and sharded across multiple storage nodes. A logical address is an address (e.g., logical block address LBA)) that represents a given volume and a given offset of a given data block (or data chunk). For example, a logical address can include a volume ID, or an internal representation along with more metadata that is required for implementing various features such as snapshots. In some embodiments, the logical space comprises a key entry per chunk of data (e.g., 8 KB data block), wherein the key represents an offset in the given volume at chunk granularity. The virtual address space comprises a unique virtual key for each chunk of data (e.g., 8 KB) which is written and consumes capacity. In the case of deduplication, multiple logical keys can point to the same virtual key.

The virtual-to-physical mapping table 286 comprises a mapping data structure which maps a virtual space to a physical space. In particular, the virtual-to-physical mapping table 286 maps each unique virtual key to a respective physical storage location in the storage system. In many cases, the virtual-to-physical mapping table 286 will also include a corresponding reference count for each virtual key, wherein the reference count for a given virtual key tracks a number of logical-to-virtual pointers that point to the given virtual key for the given physical location. It is to be noted that the "physical location" can potentially be layered on top of another level of indirection rendering it less "physical".

Figure 4:
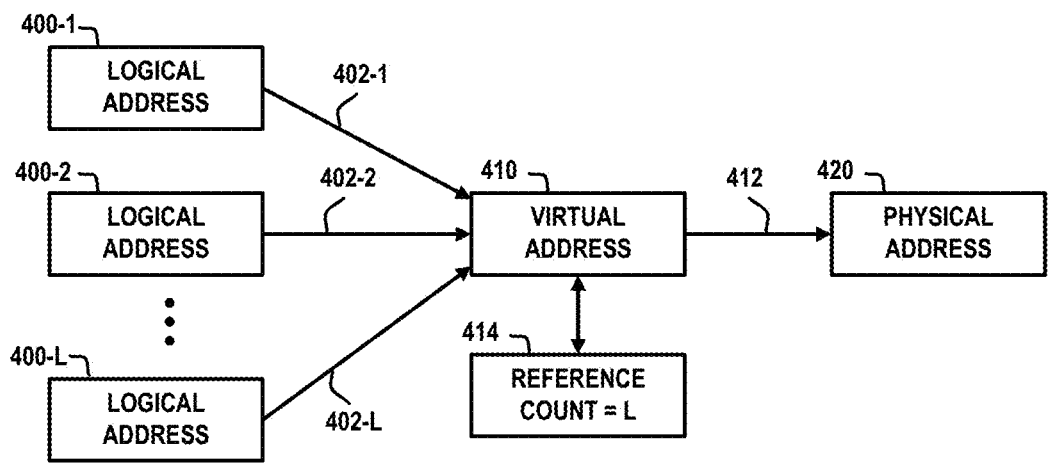
FIG. 4 schematically illustrates a logical-to-virtual mapping structure and a virtual-to-physical mapping structure tables, according to an exemplary embodiment of the disclosure.

For example, FIG. 4 schematically illustrates logical-to-virtual and virtual-to-physical mapping tables, according to an exemplary embodiment of the disclosure. As shown in FIG. 4, a plurality (L) of logical addresses 400-1, 400-2, . . . , 400-L are mapped to a single virtual address 410. The virtual address 410 comprises a unique virtual address which is mapped to a physical address 420 which stores a given data block (e.g., 8 KB data chunk). In this example, the logical addresses 400-1, 400-2, . . . , 400-L comprises respective logical-to-virtual pointers 402-1, 402-2, . . . , 402-L which point to the given virtual address 410 (virtual key), and the virtual address 410 comprises a physical pointer 412 which points to the physical address 420. As further shown in FIG. 4, the virtual address 410 (or virtual key) is mapped to a given reference count 414 which indicates a number, L, of logical addresses which point to the given virtual address 410.

With this exemplary configuration, a single pointer (e.g., virtual-to-physical pointer 412) points to the physical address 420, while all logical addresses 400-1, 400-2, . . . , 400-L which hold a reference to the given physical address 420 point to the unique virtual address 410 that is mapped to the given physical data block stored at the given physical address 420. When the given data block (currently stored at the physical address 420) is moved to another physical address, only the virtual-to-physical pointer 412 needs to be updated to point to the new physical address when the given data block was stored. In this instance, there is no need to update the logical-to-virtual pointers 402-1, 402-2, . . . , 402-L which point to the given virtual address 410 since the virtual address 410 still points to the given data block that that is referenced by the logical addresses 400-1, 400-2, . . . , 400-L.

As noted above, in some embodiments, a write-optimized tree data structure is utilized to implement the persistent deduplication databases. For example, in some embodiments, an LSM tree structure or a B-epsilon tree structure is utilized to organize key:value pairs (content signature:virtual address) for data deduplication. The write-optimized tree data structure is configured to support late identification of potential deduplication candidates as new key-value entries are added to the write-optimized tree data structure, and as such key-value entries propagate down the write-optimized tree data structure, the detection of identical keys is an indication of potential deduplication, and triggers a deduplication process.

A write-optimized tree data structure such as an LSM tree structure or B-epsilon tree structure supports blind updates and blind inserts of entries into the tree data structure, wherein inserts and updates are added to a root node (of a B-epsilon tree) or higher-level segments (of an LSM tree) of the tree data structure, and propagate down to leaf nodes (of the B-epsilon tree) or higher-level segments (of the LSM tree) of the tree data structure. In this configuration, multiple entries with the same key can concurrently exist in the tree data structure at given point in time. A query can be implemented by scanning the tree data structure from a root node (of the B-epsilon tree) or low-level segments (of the LSM tree), towards the leaf nodes or higher-level segments so that no new versions of a key will be missed. The propagation of the inserts and updates in the write-optimized tree data structure is highly IO efficient as such inserts and updates are performed in bulk, which minimizes the amount of required IO. For example, instead of performing a read-modify-update for each insert, a write-optimized data structure can reduce the required IO to only one for every 10 or more inserts.

Figure 5:
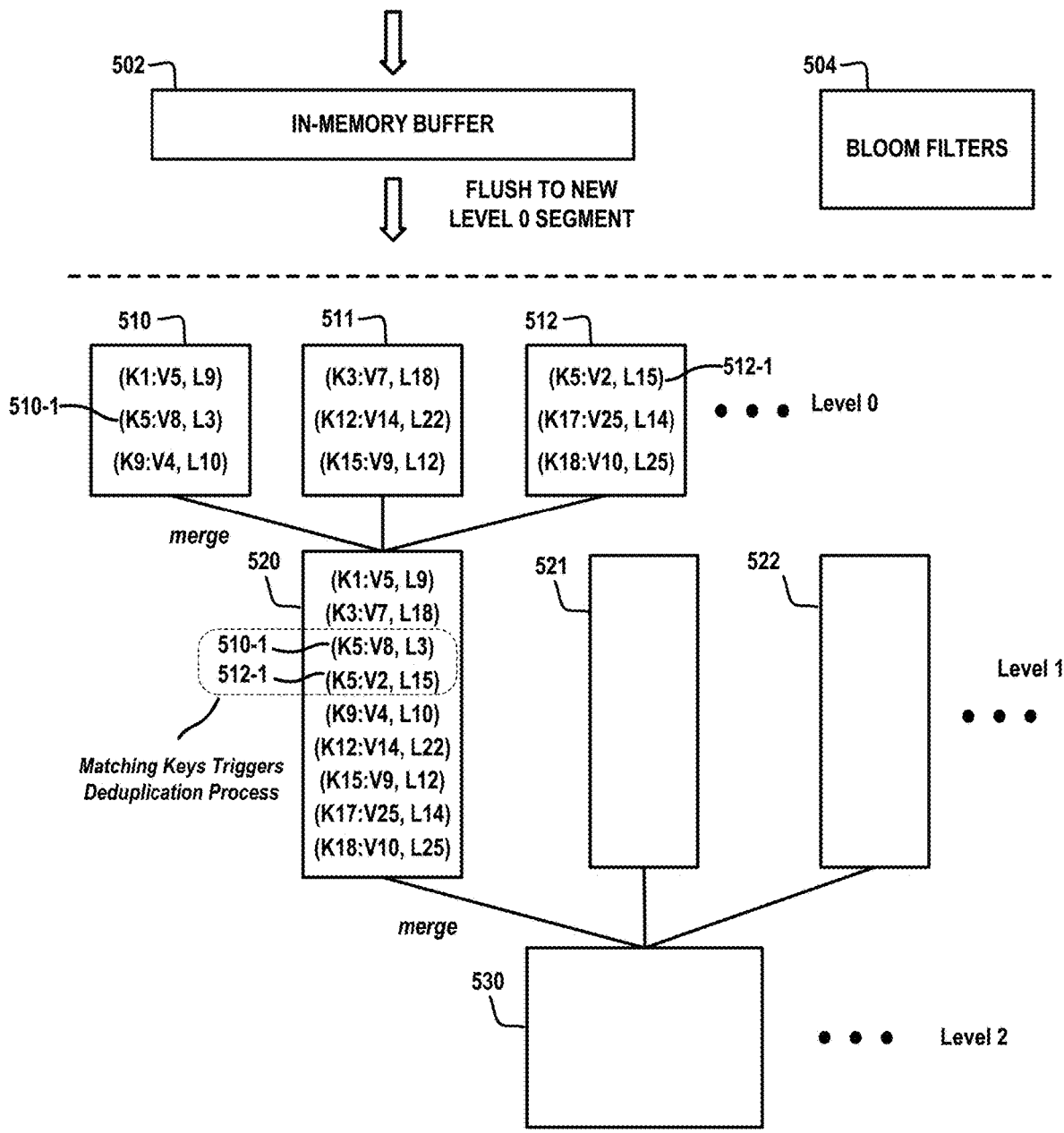
FIG. 5 schematically illustrates an exemplary log-structured merge (LSM) tree data structure which is configured to implement a persistent deduplication database, according to an exemplary embodiment of the disclosure.
Figure 6:
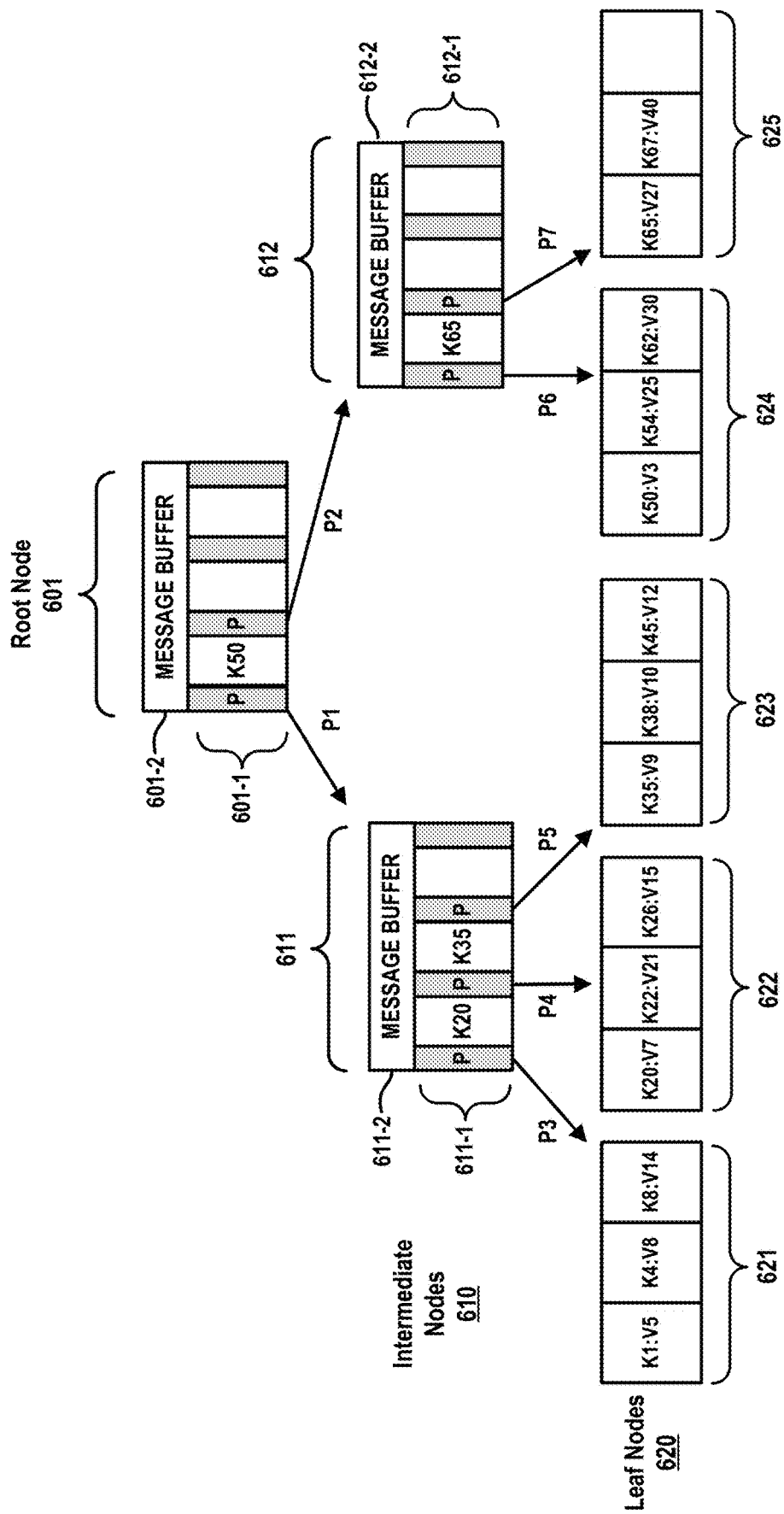
FIG. 6 schematically illustrates an exemplary B-epsilon tree data structure which is configured to implement a persistent deduplication database, according to an exemplary embodiment of the disclosure.

FIGS. 5 and 6 schematically illustrate exemplary embodiments of tree data structures which are configured to implement persistent deduplication databases. Such tree structures are configured to support the identification of deduplication candidates during merges/updates of entries of the tree data structure. For example, with a persistent deduplication database implemented as tree data structure, the merging of two entries with the same content signature key items indicates that a potential deduplication candidate has been identified. In such a case, instead of just replacing the old value with a new value, the storage control system will initiate a deduplication process to determine if the two entries correspond to duplicate data blocks, and then update the entries based on the results of the deduplication process. Since two entries with matching content signatures will have different virtual addresses, to avoid the need to chain virtual pointers, new entries that are added into the persistent deduplication database also include a logical address of the newly written content. Using the logical address information, it is possible to switch a new logical-to-virtual pointer to point to the identified virtual address of the existing data block in the event of that the deduplication operation is successful.

FIG. 5 schematically illustrates an exemplary LSM tree data structure 500 which is configured to implement a persistent deduplication database, according to an exemplary embodiment of the disclosure. The exemplary LSM tree data structure 500 implements an in-memory buffer 502, and comprises bloom filters 504, and a multilevel structure comprising one or more segment levels, e.g., Level 0, Level 1, and Level 2. The LSM tree data structure 500 is configured to enable write amortization for adding new entries into the persistent deduplication database for new incoming data blocks after the new data blocks are written to, e.g., a persistent write cache.

More specifically, the in-memory buffer 502 comprises an in-memory structure that buffers new deduplication database entries for newly written data blocks (e.g., data blocks written to a persistent write cache). In some embodiments, the new deduplication database entry for a given data block comprises a key:value (K:V) pair for the given data block, and a logical address (L) of the given data block. The key (K) is the computed content signature of the given data block, and the value (V) is the unique virtual address assigned to the given data block. In some embodiments, the new entries are initially inserted into the in-memory buffer 502 and sorted in order by key value. When the in-memory buffer 502 reaches a predefined threshold size, the accumulated entries within the in-memory buffer 502 are flushed to a Level 0 segment of the LSM tree data structure 500.

For example, as shown in FIG. 5, the LSM tree data structure 500 comprises a plurality of Level 0 segments 510, 511, and 512, etc. Each Level 0 segment 510, 511, and 512 comprises a persistent immutable data structure which stores a plurality of deduplication entries that are flushed from the in-memory buffer 502 at a given time. The process of updating the LSM tree data structure 500 prevents a high rate of updates to the Level 0 layer of the LSM tree data structure 500 by first accumulating multiple entries (e.g., tens or hundreds of entries) in the in-memory buffer 502, and then flushing the accumulated entries to a to new Level 0 segment at once.

As shown in FIG. 5, each Level 0 segment 510, 511, and 512 comprises a plurality of entries (K:V, L) that are sorted in order by key (K) value. While FIG. 5 shows each Level 0 segment 510, 511, and 512 having three (3) entries for ease of illustration, each Level 0 segment 510, 511, and 512 can have hundreds of new entries. In addition, as shown in FIG. 5, the segment 510 comprises an entry 510-1 (K5:V8, L3), and the segment 512 comprises an entry 512-1 (K5:V2, L15). In this instance, the two entries 510-1 and 512-1 have matching content signatures K5, and different virtual addresses V8 and V2, which provides an indication that the two entries correspond to duplicate data blocks.

The Level 0 segments are continuously generated as more new entries for newly written data blocks are flushed from the in-memory buffer 502. Periodically, multiple segments in a given Level of the LSM tree data structure 500 are merged together to reduce the number of segments that need to be searched. For example, as shown in FIG. 5, the segments 510, 511, and 512 in Level 0 are merged to form the segment 520 in Level 1 of the LSM tree data structure 500. The segment 520 aggregates the entries from each of the Level 0 segments 510, 511, and 512, and stores the aggregated entries in a sorted order based on the key (K) values of the entries, as shown in FIG. 5. Following the merge operation, the Level 0 segments 510, 511, and 512 are removed from the LSM tree data structure 500. While not specifically shown in FIG. 5, the segments 521 and 522 in Level 1 of the LSM tree data structure 500 could each have a plurality of sorted entries aggregated from merging different blocks of three segments in Level 0 of the LSM tree data structure 500. Moreover, a segment 530 in Level 2 of the LSM tree data structure 500 could have a plurality of sorted entries as a result of merging the segments 520, 521, and 522 in Level 2 of the LSM tree data structure 500. The LSM tree data structure 500 uses very few writes to propagate entries from one level to the next by merging segments.

As further shown in FIG. 5, as a result of merging the Level 0 segments 510, 511, and 512 to form the Level 1 segment 520, the storage control system (e.g., data deduplication control system 250, FIG. 2), identifies the two entries 510-1 and 512-1 as having matching keys K5, wherein such identification triggers a deduplication process, the details of which will be discussed in further detail below in conjunction with, e.g., FIG. 9. In this exemplary illustration, the inclusion of the logical address information L3 and L15 of the respective entries 510-1 and 512-1 essentially serves as a virtual-to-logical back-pointer, which eliminates the need to chain the virtual address pointers from the virtual addresses V2 and V8 to the existing data block in the event of a successful deduplication. The chaining of virtual pointers would yield a longer read path. However, the logical address information of the entries allows the storage control system to switch the new logical-to-virtual pointer to point to the identified virtual address of the existing data block, in the event of a successful deduplication operation.

More specifically, in the exemplary illustration of FIG. 5, the two entries 510-1 and 512-1 have matching keys K5 (e.g., matching content signatures), but different virtual addresses V8 and V2. Assume that the entry 510-1 corresponds to an existing data block Y (with logical address L3) which is stored at a physical address LOC_Y pointed to by the virtual address V8, and that the subsequent entry 512-1 corresponds to a new data block X (with logical address L15) which is stored at a physical address LOC_X pointed to by the virtual address V2. Assume further that the deduplication process validates that the new data block X is a duplicate of the existing data block Y, the logical-to-virtual address pointer, L15→V2, for the new data block X would be updated to point to the virtual address V8 of the existing data block, i.e., L15→V8, without the need to chain the virtual pointers, i.e., avoid L15→V2→V8.

In this regard, the inclusion of the logical address information in the entries allows for an efficient update of the relevant logical-to-virtual pointer (no chaining of pointers), and update to the entry 512-1 from (K5:V2, L15) to (K5:V8, L15). In some embodiments, to facilitate a query lookup of a target deduplication entry in the LSM tree data structure 500, the Bloom filters 504 can be utilized to enable an efficient per-segment lookup. A Bloom filter for a given segment provides an indication that (i) the given segment may contain a key that is being searched for with a high probability, or that (ii) the given segment does not include the key that is being searched. In some embodiments, if a given segment is identified (via Bloom filtering) to likely have the target key, a binary search can be conducted to find and access the key within the given segment (if the key does in fact exist in the given segment). In some embodiments, for large-sized segments, once a given segment is identified (via Bloom filtering) as most likely containing the target key, a block or page index for the given segment can be used to identify a given block or page of entries within the given segment which would have the key (if the key was indeed in the segment). Once the target block/page of entries in the given segment is identified via the block/page index, the block/page can be searched via a binary search to find the target key.

FIG. 6 schematically illustrates an exemplary B-epsilon tree data structure which is configured to implement a persistent deduplication database, according to an exemplary embodiment of the disclosure. In particular, FIG. 6 schematically illustrates an exemplary B-epsilon tree data structure 600 comprising three levels of nodes including a root level comprising a root node 601, an intermediate node level 610, and a leaf node level 620. The intermediate node level 610 comprises two intermediate nodes 611 and 612, and the leaf node level 620 comprises five leaf nodes 621, 622, 623, 624, and 625, wherein all leaf nodes are in the same level of the B-epsilon tree data structure 600. For ease of illustration and discussion, FIG. 6 depicts an exemplary B-epsilon tree data structure 600 at a given point in time which includes fourteen (14) key:value entries across the leaf nodes 621-625, e.g., entries K1:V5, K4:V8, K8:V14, K20:V7, K22:V21, K26:V15, K35:V9, K38:V10, K45:V12, K50:V3, K54:V25, K62:V30, K65:V27, and K67:V40, which key:value entries are sorted in order of key values. Again, the keys K represent content signatures, and the values V represent virtual addresses.

In some embodiments, as shown in FIG. 6, the B-epsilon tree data structure 600 comprises a write optimized B+ tree structure in which the root node 601, and the intermediate nodes 611 and 612 store respective pivot keys and child pointers 601-1, 611-1, and 612-1, and the leaf nodes 621-625 store key:value pairs, sorted by the key. In addition, for the B-epsilon tree data structure 600, the root node 601, and the intermediate nodes 611 and 612 comprises respective message buffers 601-2, 611-2, and 612-2 which are configured and utilized to store messages, wherein the messages encode updates that are eventually applied to the leaf nodes. As explained in further detail below, the message buffers are utilized for, e.g., adding new deduplication entries to the persistent deduplication database configured as the B-epsilon tree data structure 600.

For ease of illustration, the exemplary B-epsilon tree data structure 600 is an n-order tree structure, wherein n=3. The "order" of a B-epsilon tree data structure denotes a maximum number of key fields that a given node can have. For n=3, the internal nodes and leaf nodes can have at most n=3 key fields and n+1=4 pointer fields. In addition, when n=3, each leaf node must have a least two (2) entries, and each non-leaf node must have at least one (1) entry and two (2) pointers. In practice, the order n of the B-epsilon tree data structure 600 would be in the hundreds, or thousands, etc. In this regard, while the exemplary embodiment of FIG. 6 shows the exemplary B-epsilon tree data structure 600 having three levels of nodes (the root node 601 level, the intermediate node level 610, and the leaf node level 620 level), it is to be understood that at any given time, there can be zero (0) to N intermediate levels of nodes since, as a B-epsilon tree data structure grows from the leaf nodes upward. In this regard, at some period of time, the B-epsilon tree may only have leaf nodes, with zero (0) non-leaf nodes.

The B-epsilon tree data structure 600 is configured to organize the deduplication entries in a manner which enables efficient lookup functionality for key:value pair entries in the leaf nodes 621, 622, 623, 624, and 625, and for associated messages in the message buffers (which may indicate an update to a given entry in a leaf node, or a deletion of a given entry in a leaf node, etc.). In the exemplary embodiment of FIG. 6, the root node 601 comprises a key value K50, with a pointer P1 to the intermediate node 611, and a pointer P2 to the intermediate node 612. The root node 601 comprises two empty key fields and two empty pointer fields, which can be used when new leaf nodes are added to the B-epsilon tree data structure 600, resulting in a change in the structure of the inner nodes (root and intermediate nodes). The pointer P1 points to a branch of the B-epsilon tree data structure 600 having nodes with key values that are less than the key value of K50. The pointer P2 points to a branch of the B-epsilon tree data structure 600 having nodes with key values that are greater than, or equal to, the key value K50. More specifically, in the exemplary embodiment of FIG. 6, the pointer P1 points to the intermediate node 611, while the pointer P2 points to the intermediate node 612.

As further shown in FIG. 6, the intermediate node 611 comprises key values K20 and K35, and pointers P3, P4, and P5. The intermediate node 611 includes one empty key field and one empty pointer field, which can be used when new leaf nodes are added to the B-epsilon tree data structure 600. The pointer P3 points to the leaf node 621 having key:value entries with key values K1, K4, and K6 that are less than the key value K20. The pointer P4 points to the leaf node 622 having key:value entries with key values K20, K22, and K26 that are greater than or equal to the key value of K20, but less than the key value K35. The pointer P5 points to the leaf node 623 having key:value entries with key values K35, K38, and K45 that are greater than or equal to the key value of K35, but less than the key value K50.

Furthermore, the intermediate node 612 comprises a key value 65 and pointers P6 and P7. The intermediate node 612 comprises two empty key fields and two empty pointer fields, which can be used when new leaf nodes are added to the B-epsilon tree data structure 600. The pointer P6 points to the leaf node 624 having key:value pairs with key values K50, K54, and K62 that are less than the key value K65. The pointer P7 points to the leaf node 625 having key:value pairs with key values K65 and K67 that are greater than or equal to the key value K65. The leaf node 625 comprises an empty data record, which can be used when new leaf nodes are added to the B-epsilon tree data structure 600. The B-epsilon tree data structure 600 comprises a dynamic multilevel indexing data structure which can grow and shrink as leaf nodes are added or removed from the B-epsilon tree data structure. The B-epsilon tree data structure grows from the bottom up by the addition of new leaf nodes when data is written to storage using B-tree insertion methods well-known to those of ordinary skill in the art.

As noted above, the B-epsilon tree data structure 600 is a write-optimized B+ tree structure in which the message buffers of the internal nodes (e.g., message buffers 601-2, 611-2, and 612-2) are utilized to write new deduplication entries (e.g., insertion messages) into the B-epsilon tree data structure 600 and propagate such entries down the tree from the root to leaf nodes. More specifically, instead of directly propagating insertion, deletion, and update operations down the B-epsilon tree data structure towards target leaf nodes as in standard B+ or B-tree data structures, such operations are encoded as messages that are written into the message buffers of the internal nodes starting from the root node (e.g., root node 601).

As noted above, in some embodiments, each deduplication database entry (e.g., insertion or update message) for a given data block comprises a key:value (K:V) pair for the given data block, and a logical address (L) of the given data block, wherein the key (K) is the computed content signature of the given data block, and the value (V) is the unique virtual address assigned to the given data block. When utilizing the B-epsilon tree data structure 600 as a persistent deduplication database, batches of new deduplication entries are initially written to the message buffer of the root node, e.g., the message buffer 601-2 of the root node 601. The entries are sorted by key value and creation timestamps to maintain the order of messages related to the same key.

When a sufficient number of new entries have been added to the message buffer 601-2 of the root node 601 (e.g., the message buffer becomes full or close to full), a batch of entries (and other messages) are flushed to the message buffers of one or more child nodes of the root node. Typically, the child node with the greatest number of pending messages in its message buffer is selected. As the messages are flushed in batch from internal nodes to child nodes down the levels of the B-epsilon tree (from root to leaf), each message is eventually delivered to the appropriate leaf node, and the new or updated entries (insertion and update messages) are applied to the relevant leaf nodes, or deleted entries (identified by, e.g., tombstone messages) are removed from leaf nodes.

When a batch of messages is flushed from the message buffer of a given parent node to the message buffer of a given child node, the new set of messages in the message buffer of the given child node will be sorted by key value. Similar to the segment merging operation discussed above with regard to the LSM tree data structure 500 of FIG. 5, a late identification deduplication process is triggered if the resulting set of messages in the message buffer of the child node comprises at least two entries that are identified as having matching keys (e.g., content signatures). Such identification triggers a deduplication process, the details of which will be discussed in further detail below in conjunction with, e.g., FIG. 9. It is to be noted that the entries of the leaf nodes 621-625 shown in FIG. 6 include the key:value pairs, but not logical address information. This is because the logical address information of the entries is not needed and is discarded at the lowest level (e.g., leaf nodes) of the write-optimized data structure. Such logical address information is only needed by new entries as they propagate down the tree data structure and may merge with existing entries with the same key (content signature).

It is to be noted that the exemplary B-epsilon tree data structure 600 shown in FIG. 6 is presented for ease of illustration and discussion. The B-epsilon tree data structure 600 can have hundreds or thousands of leaf nodes and internal nodes, as is understood by those of ordinary skill in the art. As new entries are added to the B-epsilon tree data structure 600, when a given leaf node becomes too full, the leaf node is split into two leaf nodes, and one or more upper internal nodes may be split accordingly. For example, when an internal node has too many children, the internal node will split into two new internal nodes and the pivots and messages in its message buffer are distributed between the two new internal nodes. With this configuration, the messages (e.g., new or updated entries) associated with a given key K are guaranteed to be applied to the target leaf node with corresponding entry for the given key K, or applied to some internal node along a root-to-leaf path towards the leaf node with the corresponding entry for the given key K. In the B-epsilon tree structure, a point query visits each node from the root to the target leaf, while checking the message buffers in the nodes along such query path for messages, and applying relevant messages before returning the results of the query.

Figure 7:
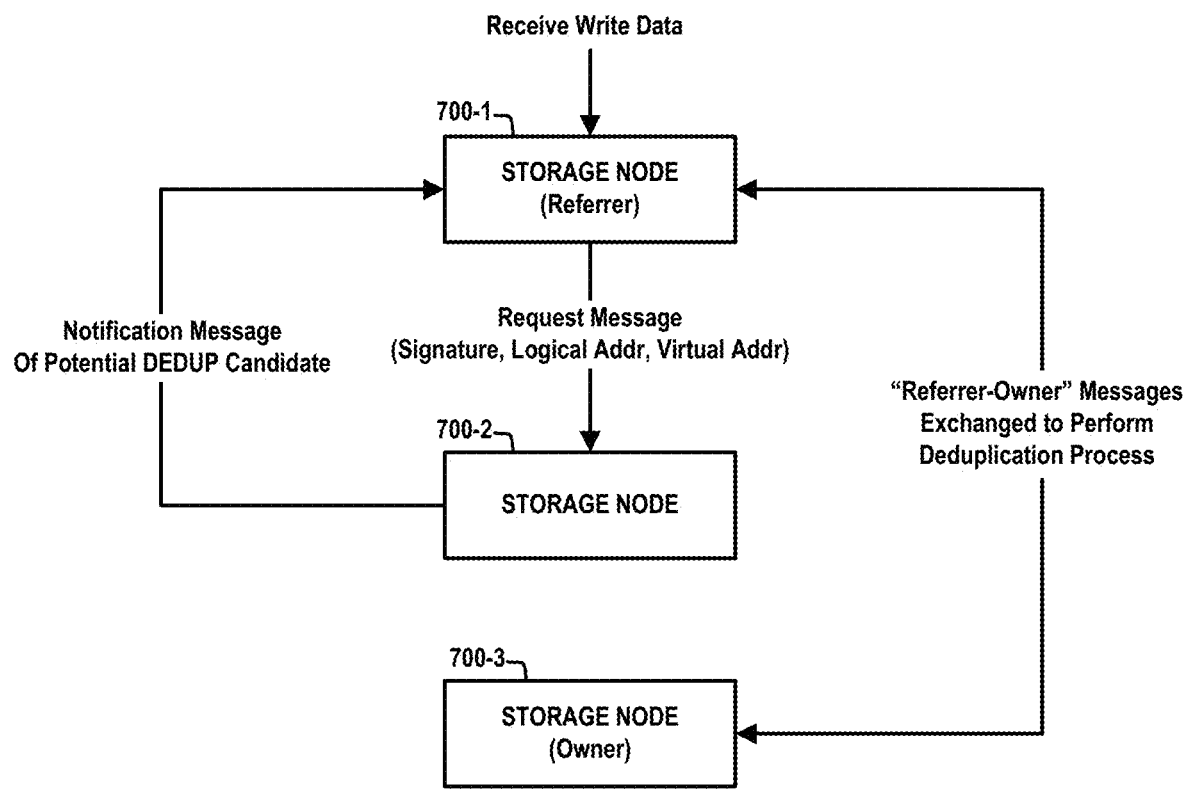
FIG. 7 schematically illustrates a system of storage nodes which is configured to perform data deduplication, according to an exemplary embodiment of the disclosure.
Figure 8:
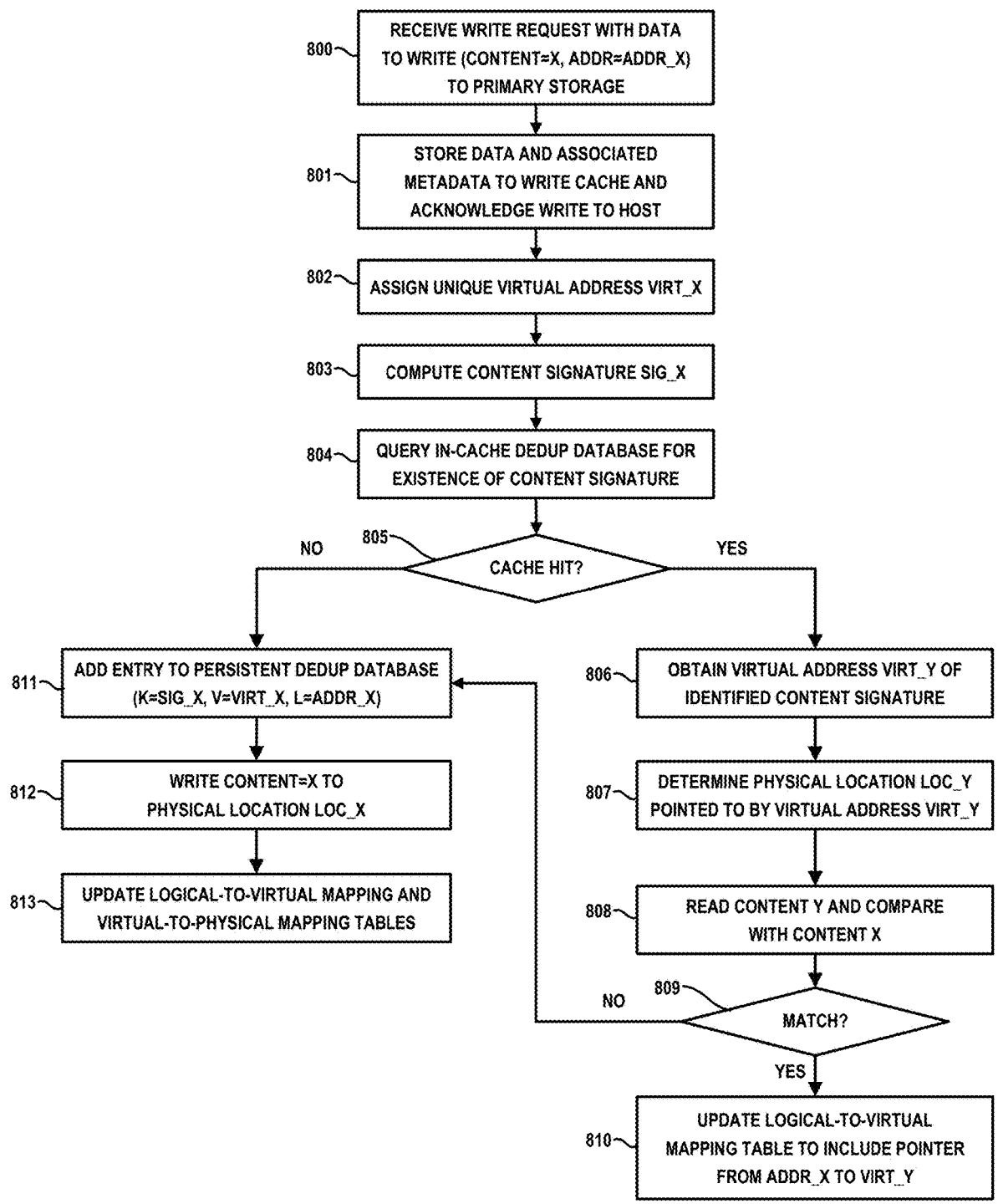
FIG. 8 schematically illustrates a method for performing data deduplication, according to an exemplary embodiment of the disclosure.

Exemplary methods for performing data deduplication will now be discussed in further detail with reference to FIGS. 7, 8, and 9. FIG. 7 schematically illustrates a system of storage nodes which is configured to perform data deduplication, according to an exemplary embodiment of the disclosure. For illustrative purposes, FIG. 7 schematically illustrates a deduplication process that is performed by a system 700 of storage nodes in a storage system that implements a distributed deduplication database in which a content signature space (e.g., hash space) is partitioned between some or all of the storage nodes of the storage system, wherein the storage nodes are responsible for provisioning and managing respective local deduplication databases which hold respective key partitions, as discussed above in conjunction with FIG. 3. In addition, FIGS. 8 and 9 illustrate flow diagrams of methods for semi-inline data deduplication and late identification deduplication, according to exemplary embodiments of the disclosure, which can be implemented by the system 700 of FIG. 7.

As shown in FIG. 7, the system 700 comprises a first storage node 700-1, a second storage node 700-2, and a third storage node 700-3, which operatively communicate to perform data deduplication. The first storage node 700-1 receives I/O write data to be stored to primary storage. In this exemplary embodiment, it is assumed that the I/O write data comprise a logical address for a given storage volume which is included in a range of logical addresses for the given volume which is handed by the first storage node 700-1. The first storage node 700-1 divides the I/O write data into a plurality of data blocks having a predetermined block size (e.g., 8 KB). By way of example, a 128 KB file can be divided into sixteen (16) data blocks, wherein each data block has a block size of 8 KB. The first storage node 700-1 computes a content signature (e.g., hash value) for each data block. Based on the value of given content signature for a given data block, the first storage node 700-1 will know which storage node is responsible for managing a local deduplication database for the specific content signature value computed for the given data block.

In the exemplary embodiment of FIG. 7, it is assumed that the first storage node 700-1 determines that the second storage node 700-2 is responsible for managing the local deduplication database for the given content signature value computed for the given data block. The first storage node 700-1 sends a message (e.g., remote procedure call (RPC) message) to the second storage node 700-2 to determine if there is a potential duplicate data block stored in a primary storage of another storage node. In some embodiments, the message comprises (i) the computed content signature for the given data block, (ii) the logical address of the given data block, and (iii) a unique virtual address assigned to the given data block by the first storage node 700-1.

In response to the message, the second storage node 700-2 proceeds to determine if the given data block is a duplicate of an existing data block in the storage system. In some embodiments, the second storage node 700-2 determines if the given data block is a duplicate of an existing data block by querying an in-RAM cached deduplication database maintained by the second storage node 700-2, or by a late identification process which identifies a potential duplicate when the second storage node 700-2 updates a local persistent deduplication database managed by the second storage node 700-2. In an instance where querying the in-RAM cached deduplication database does not result in immediately identifying the given data block as a potential duplicate of an existing data block, the second storage node 700-2 can return a message to the first storage node 700-1 indicating such results, thereby allowing the first storage node 700-1 to destage the data block from the write cache at a given time and store the destaged data block to a primary storage managed by the first storage node 700-1.

On the other hand, when the second storage node 700-2 determines that the given data block is a potential duplicate of an existing data block (either immediately as a result of querying the in-RAM cached deduplication database, or at some later time as a result of late identification of the potential duplicate when updating the local persistent deduplication database), the second storage node 700-2 will send a notification message to the first storage node 700-1 with information that allows the first storage node 700-1 to determine another storage node which owns the existing data block. In the exemplary embodiment of FIG. 7, it is assumed that the third storage node 700-3 is determined by the second storage node 700-2 to be the owner of the existing data block. In this instance, the first storage node 700-1 (operating as a referrer node) sends a deduplication request to the third storage node 700-3 (operating as an owner node) to initiate a "referrer-owner" negotiation process to verify whether the given data block (stored by the first storage node 700-1) is a duplicate of the existing data block owned by the third storage node 700-3. In this instance, the "referrer-owner" negotiation process involves the exchange of messages between the first and third storage nodes 700-1 and 700-3 to perform data deduplication operations.

It is to be noted that the term "owner" or "owner node" as used herein denotes a compute entity (e.g., storage node) which "owns" a given data item (e.g., a compute entity to which a first copy of the data item was originally written). The term "referrer" or "referrer node" as used herein denotes a compute entity (e.g., storage node) which is writing (or which has written) a new data block that may or may not be the same or similar to an existing original data block that is owned by the "owner". The referrer node and the owner node conduct a negotiation process to determine whether a new data block is identical or similar to an existing data block that is owned by the owner node, and to establish a reference between the referrer and the owner when the new data block is determined to be identical or similar. Ultimately, if the new data block is determined to be a duplicate of the existing data block, the duplicate data block is replaced with a reference (e.g., pointer) that points to the existing data block. Once the data has been deduplicated, upon read back of a given file containing one or more data blocks, whenever a reference (e.g., pointer) is found for the given file, the system will replace the reference with the unique data block associated with the reference.

Figure 9:
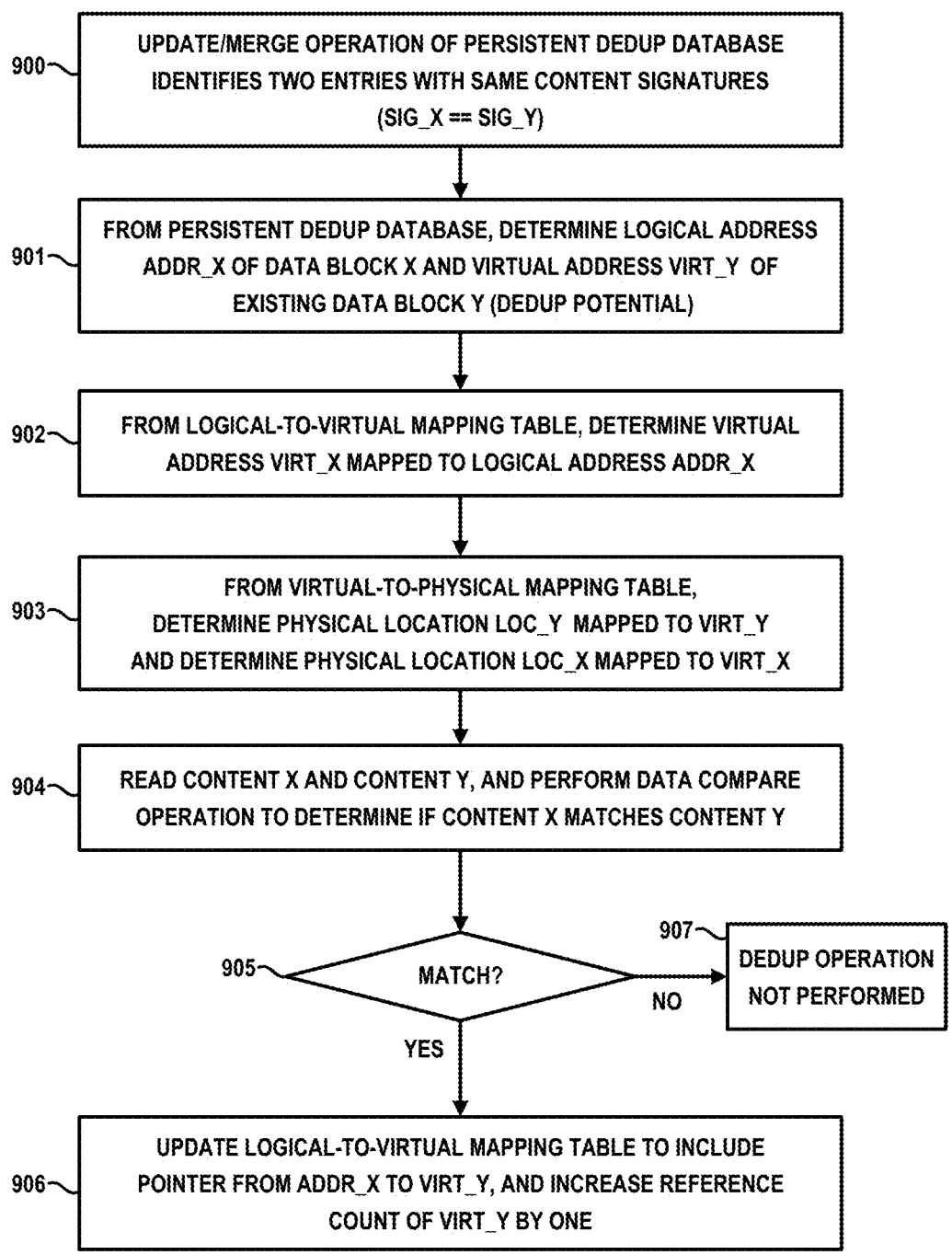
FIG. 9 schematically illustrates a method for performing data deduplication, according to another exemplary embodiment of the disclosure.

Next, FIGS. 8 and 9 illustrate flow diagrams of methods for performing data deduplication according to exemplary embodiments of the disclosure. In particular, FIG. 8 is a flow diagram of a method for performing semi-inline data deduplication according to an exemplary embodiment of the disclosure, and FIG. 9 is a flow diagram of a method for performing late identification deduplication according to an exemplary embodiment of the disclosure. For illustrative purposes, the exemplary process flows shown in FIGS. 8 and 9 may be discussed in the context of the distributed system 700 of FIG. 7 wherein the content signature space (e.g., hash key space) is sharded across multiple storage nodes in the data storage system.

Referring to FIG. 8, a first storage node receives a write request with data to be written to primary storage (block 800). The first storage node writes the data and associated metadata to a write cache and an acknowledgment message is returned to the host application once the data is successfully stored in the write cache (block 801). As noted above, the first storage node divides the incoming write data into a plurality of data blocks having a predetermined block size (e.g., 8 KB). For purposes of discussion, it is assumed that the write data stored in the write cache comprises a data block X with CONTENT=X, and a logical address ADDR=ADDR_X.

The first storage node will assign a unique virtual address, VIRT_X, to the data block X, which is mapped to the logical address ADDR_X (block 802). In addition, the first storage node will compute a content signature, SIG_X, for the data block X (block 803). For example, in some embodiments, the content signature comprises a hash value that is computed using any suitable hashing algorithm, e.g., Secure Hash Algorithm (e.g., SHA-1, SHA-2, SHA-256), which is configured to create a unique alpha-numeric value (hash value) for a given data block.

Next, a semi-inline deduplication process is initiated by querying an in-RAM cached deduplication database to determine whether a matching content signature exists in the cached deduplication database (block 804). In some embodiments, the first storage node will determine which storage node is currently assigned to handle the content signature range (e.g., key partition) that includes the computed value of the content signature. If the first storage node is determined to be responsible, the first storage node will query its local in-RAM cached deduplication database to perform a lookup operation to determine whether a cached content signature exists which is the same or similar to the computed content signature. The database lookup operation is performed to compare the computed content signature SIG_X of the given data block X to the cached content signatures of the in-RAM cached deduplication database.

On the other hand, as discussed above in conjunction with FIG. 7, if the first storage node determines that a second storage node is currently assigned to handle the range of content signature values (e.g., key partition) that includes the computed value of the content signature, the first storage node sends a message (e.g., RPC message) to the second storage node requesting the second storage node to query its local in-RAM cached deduplication database to determine whether a cached content signature exists which is the same or similar to the computed content signature SIG_X. Again, in some embodiments, the message comprises (i) the computed content signature SIG_X for the given data block X, (ii) the logical address ADDR_X of the given data block X, and (iii) the unique virtual address VIRT_X assigned to the given data block X by the first storage node.

When the result of the database lookup operation indicates that a matching content signature exists in the target in-RAM cached deduplication database, e.g., resulting in a "cache hit" (affirmative result in block 805), a referrer-owner negotiation process is initiated by the first storage node to verify whether the given data block X is a duplicate of an existing data block Y (with content Y) associated with the matching content signature. As an initial phase of the negotiation process, the first storage node (acting as a referrer node) obtains a virtual address, VIRT_Y, associated with the existing data block Y (block 806). In some embodiments, as noted above, the deduplication databases map unique content signatures to respective unique virtual addresses. In this instance, the virtual address, VIRT_Y, that is obtained is the unique virtual address which is mapped to the matching content signature in the (local or remote) in-RAM cached deduplication database. The first storage node (referrer node) sends a deduplication request message to a target storage node (owner node) to initiate the "referrer-owner" negotiation process. The deduplication request will include the virtual address, VIRT_Y, and possibly other information which identifies the location of the data block associated with the matching content signature.

In response to receiving the deduplication request, the target (owner) storage node will utilize the virtual address VIRT_Y to determine the physical storage location, LOC_Y, of the existing data block Y, which is pointed to by the virtual address VIRT_Y (block 807). As noted above, in some embodiments, each unique virtual address (in the virtual address space) points to a single data block (in the physical storage space). In some embodiments, the target (owner) storage node will determine whether the data block exists. For example, there may be a circumstance in which the owner node deleted the data block prior to receiving the deduplication request. If the owner node determines that the data block does not exist, the owner node will notify the referrer node that the data block does not exist, in which case the given data block can be stored in a target storage array, and the local or remote deduplication database can be updated to include the computed content signature of the given data block (e.g., perform blocks 811 and 812).

On the other hand, if the owner node determines that the data block does exist, the existing data block Y will be read from storage, and the content of the data block Y will be compared to the new data block X to determine if the data blocks X and Y have matching content (block 808). In some embodiments, the owner node will read the existing data block Y from storage and send a copy of the data block Y to the referrer node to perform the content compare process. In some embodiments, the owner node sends a response message to the referrer node which includes a confirmation/approval to proceed with deduplication, along with metadata (e.g., pointer) that enables the referrer node to access the existing data block Y from a target storage node. In this instance, the referrer node will directly read the existing data block Y from the physical storage and then perform the compare process. In other embodiments, the referrer node sends a copy of the new data block X to the owner node, in which case the owner node reads the existing data block Y from storage and performs the content compare process.

As noted above, in some embodiments, the content compare process comprises a byte-by-byte compare process to determine whether or not the given data block X is a duplicate of the existing data block Y. While exemplary embodiments are described herein the context of performing byte-by-byte data compare operations for deduplication validation, it is to be appreciated that the exemplary deduplication techniques can be implemented for similarity-based deduplication. With a similarity-based deduplication process, the referrer creates a reference to existing original data block which is deemed to be similar but not identical to the new data block, and the referrer stores the changes between the original data block and the new data block.

If the deduplication validation operation is successful, i.e., the data compare process determines that the content of the data blocks X and Y match (affirmative determination in block 809), the referrer node will create reference to the existing data block Y, and discard/delete the given data block X. More specifically, in some embodiments, the referrer node will create reference to the existing data block Y by updating a logical-to-virtual mapping table to include a pointer from the logical address ADDR_X of the data block X to the unique virtual address VIRT_Y that is mapped to the existing data block Y. In addition, in some embodiments, the owner node will update a virtual-to-physical mapping table by incrementing (by one) the reference count for the virtual address VIRT_Y that is mapped to the physical address of the existing data block Y (block 810).

In some embodiments, the reference count for the virtual address VIRT_Y is incremented by one in response to notification of a successful deduplication validation operation. In other embodiments, the reference count for the virtual address VIRT_Y is incremented by the owner node prior to the deduplication validation operation. In this instance, the deduplication operation for the given data block is deemed complete, without the need for the referrer node to send a notification message to the owner node to notify the owner node of the successful deduplication operation. Since the owner node has already incremented the reference count for the unique virtual address VIRT_Y mapped to the existing data block Y, in the absence of receiving a deduplication validation failure notification from the referrer node, the owner node can assume that the deduplication operation was successful, and maintain the reference count at the incremented count value. On the other hand, the referrer node can send a deduplication validation failure notification to the owner node when there is no match and, in response to such failure notification, the owner node will decrement the reference count for VIRT_Y.

In instances where (i) the result of the database lookup operation indicates that no matching content signature exists in the target in-RAM cached deduplication database (negative result in block 805), or (ii) the deduplication validation operation is not successful, i.e., the data compare process determines that the content of the new data block X does not match the content of the existing data block Y (negative determination in block 809), a new entry for the data block X is added to the persistent deduplication database (block 811). In some embodiments, the new entry comprises (i) the content signature SIG_X (key) of the data block X, (ii) the virtual address VIRT_X (value) assigned to the data block X, and (iii) the logical address ADDR_X (auxiliary information) of the data block X. The new entry is added to the persistent deduplication database of the referrer node when the value of the content signature SIG_X of the data block X falls within the content signature range (key partition) managed by the referrer node. Otherwise, the new entry is added to the persistent deduplication database of another storage node when the value of the content signature SIG_X of the data block X falls within the content signature range (key partition) managed by the other storage node.

At some point in time, the first storage node will destage the data block X from the write cache and store the data block X to primary storage (block 812). In this instance, the content, CONTENT=X, of the data block X will be written to a physical location LOC_X in primary storage managed by the storage node. The first storage node will then proceed to update the logical-to-virtual and virtual-to-physical mapping tables (block 813). More specifically, the logical-to-virtual mapping table is updated by adding the logical address ADDR_X and the virtual address VIRT_X with a pointer from ADDR_X to VIRT_X (e.g., for a key-value store, ADDR_X is the key, and VIRT_X is the value). In addition, the virtual-to-physical mapping table is updated by adding the virtual address VIRT_X and the physical address LOC_X with a pointer from VIRT_X to LOC_X (e.g., for a key-value store, VIRT_X is the key, and LOC_X is the value).

It is to be noted that the process flow of FIG. 8 illustrates an exemplary embodiment of a "semi-inline" deduplication process in which inline deduplication is only performed by identifying a potential deduplication candidate based on matching content signatures in the in-RAM cached deduplication database. In the event of a cache miss (negative determination in block 805), the persistent deduplication database is not immediately searched for a potential deduplication candidate. In this regard, in the event of a cache miss, it cannot be assumed that new data block X is unique. Instead, a late identification deduplication process (FIG. 9) may identify the new data block X as a duplicate of an existing data block Y. It is to be further noted that there can be a circumstance where after adding the new entry for the data block X to the persistent deduplication database (block 811), the data block X remains in the write cache for some period of time in which the data block X is identified (via the late identification process of FIG. 9) as a duplicate of an existing data block Y. In this instance, if deduplication is successful, the write of the data block X to the primary storage is avoided.

For illustrative purposes, the exemplary process flow for performing late identification deduplication as shown in FIG. 9 will be discussed in the context of the new and existing data blocks X and Y discussed above in conjunction with FIG. 8, wherein it is assumed that the semi-inline deduplication process of FIG. 8 did not result in initially identifying the new data block X as a potential duplicate of the existing data block Y, due to the cache miss. As noted above, as a result of the cache miss (negative result in block 805), a new entry for the data block X is added to the persistent deduplication database (block 811), wherein the new entry comprises a key=SIG_X, a value=VIRT_X, and a logical address=ADDR_X).

At some point in time, an update/merge operation performed on the persistent deduplication database results in identifying two entries (e.g., entries for data blocks X and Y) having a same content signature (e.g., SIG_X==SIG_Y) (block 900), which triggers a late identification deduplication process to determine if the data block X is a duplicate of data block Y. The late identification deduplication process begins by determining, from the persistent deduplication database, the logical address ADDR_X of the data block, and the virtual address VIRT_Y of the data block Y (block 901). In this example, it is assumed that the entries for data blocks X and Y indicate that the data block Y is an existing data block (deduplication potential) in that the entry for the data block Y is previous to the entry for the data block X.

As noted above, the storage node that is responsible for managing the given persistent deduplication database may be the referrer node, or another node which sends a notification message to the referrer node that a potential deduplication candidate has been identified. In all instances, the referrer node sends a deduplication message to the owner node to initiate a referrer-owner negotiation process to verify whether the given data block X is a duplicate of the existing data block Y. As part of the referrer-owner negotiation process, the referrer node accesses the logical-to-virtual mapping table to determine the virtual address VIRT_X which maps to the logical address ADDR_X of the data block X (block 902). Next, the referrer and owner node access their respective virtual-to-physical mapping tables to determine (i) the physical location LOC_Y which maps to the virtual address VIRT_Y, and (ii) the physical location LOC_X which maps to the virtual address VIRT_X (block 903).

Next, the existing data block Y will be read from storage, and the content of the data block Y will be compared to the data block X to determine if the data blocks X and Y have matching content (block 904). In some embodiments, the owner node will read the existing data block Y from storage and send a copy of the data block Y to the referrer node to perform the content compare process. In some embodiments, the owner node sends a response message to the referrer node which includes a confirmation/approval to proceed with deduplication, along with metadata (e.g., pointer) that enables the referrer node to access the existing data block Y from a target storage node. In this instance, the referrer node will directly read the existing data block Y from the physical storage and then perform the compare process (e.g., byte-by-byte compare process) to determine whether or not the given data block X is a duplicate of the existing data block Y.

If the deduplication validation operation is successful, i.e., the data compare process determines that the content of the data blocks X and Y match (affirmative determination in block 905), the referrer node will create reference to the existing data block Y, and discard/delete the given data block X. More specifically, in some embodiments, the referrer node will create reference to the existing data block Y by updating the logical-to-virtual mapping table to include a pointer from the logical address ADDR_X of the data block X to the unique virtual address VIRT_Y that is mapped to the existing data block Y, and the owner node will update a virtual-to-physical mapping table by incrementing (by one) the reference count for the virtual address VIRT_Y that is mapped to the physical address of the existing data block Y (block 906). As noted above, in other embodiments, the reference count for the virtual address VIRT_Y is incremented by the owner node prior to the deduplication validation operation. Further, in some embodiments, the referrer node will decrease the reference count for the virtual address VIRT_X by one.

On the other hand, if the deduplication validation operation is not successful, i.e., the data compare process determines that the content of the data blocks X and Y do not match (negative determination in block 905), the deduplication operations is terminated and not further action is taken at that time (block 907). In this instance, the data block X is deemed unique at the given point in time, although another late identification process that is initiated in response to a further update/merging of entries in the persistent deduplication table may result in finding that the given data block X is a duplicate of some existing data block.

It should be noted that performing deduplication at a time when merging two entries can lead to the loss of at least one of the logical addresses, when the merging of matching entries occurs at intermediate segment levels of an LSM tree data structure or non-leaf nodes of a B-epsilon tree data structure. If this action is performed while the entries propagate down the LSM or B-epsilon tree data structure, further merges will result in chaining virtual pointers when a logical address is unavailable. Instead, in some embodiments, a merge of matching entries occurs when such matching entries reach a bottommost segment level or leaf node of the tree data structure, after which no further merges will occur to lower levels. As such, performing the deduplication at this point of late identification (when matching entries are merged into a bottommost segment level or leaf node of the tree data structure) will avoid chaining.

In some embodiments, the process flow of FIG. 9 applies to late identification when matching entries are merged into a bottommost segment level or leaf node of the tree data structure. In such embodiments, it may take longer to identify deduplication candidates, which may result in the associated data being destaged from the write cache. Therefore, in other embodiments, the process flow of FIG. 9 can be modified to perform deduplication when matching entries are found at any level of the tree data structure upon merging elements of the tree data structure. In such embodiments, if the deduplication control system identifies multiple entries with matching content signatures (e.g., SIG_X==SIG_Y, block 900) during a merge operation, the deduplication control system can perform an early deduplication process (e.g., blocks 901, 902, 903, 904, and 905).

If the deduplication validation operation is successful in block 905, e.g., the data compare process determines that the content of the data blocks X and Y match (affirmative determination in block 905), the deduplication control system will perform a read operation of the deduplication database (e.g., query the tree data structure) to fetch the oldest entry in the deduplication database which as the same key SIG_Z (e.g., content signature). Assuming the oldest entry for SIG_Z comprises a virtual address VIRT_Z which is mapped to a physical address LOC_Z that stores a data block Z, the deduplication system will then proceed to perform a second deduplication process to determine if the data block Z matches the data block X or data block Y. If there is match, then nodes will create (i) a first reference to the existing data block Z by updating the logical-to-virtual mapping table to include a pointer from the logical address ADDR_X of the data block X to the unique virtual address VIRT_Z that is mapped to the existing data block Z, (ii) a reference to the existing data block Y by updating the logical-to-virtual mapping table to include a pointer from the logical address ADDR_Y of the data block Y to the unique virtual address VIRT_Z that is mapped to the existing data block Z, and (ii) the owner node of block Z will update a virtual-to-physical mapping table by incrementing (two times) the reference count for the virtual address VIRT_Z that is mapped to the physical address of the existing data block Z.

It is to be appreciated that the exemplary deduplication system and methods disclosed herein provide various advantages over conventional deduplication techniques. For example, in some embodiments, a semi-inline deduplication is implemented by utilizing an in-RAM cached deduplication database which comprises "hot" content signatures. The semi-inline deduplication process enables early identification of potential deduplication candidates using "hot" content signatures associated with common dedupable data patterns, while avoiding inline deduplication if a given content signature for a new incoming data block is not found in the in-RAM cached deduplication database. In this regard, pages of a persistent deduplication database are not swapped in and out of RAM to find a matching content signature, as in conventional inline deduplication methods. The exemplary semi-inline deduplication process enhances system performance in instances where, e.g., the incoming data is initially persisted to a write cache, and is identified as being a duplicate of existing data via the semi-inline deduplication process, wherein such early identification and deduplication avoids the need to write the actual data to persistent storage.

In addition, the exemplary semi-post process deduplication methods discussed herein dramatically reduce the processing associated with identifying potential deduplication in the storage system. With conventional post-process deduplication, newly received data is first stored in the storage system, and a deduplication process is initiated at some later time by scanning the storage system to identify potential deduplication candidates, and then performing deduplication operations to remove the duplicated data block. In contrast, exemplary embodiments of the disclosure utilize a write-optimized tree data structure (e.g., LSM tree, B-epsilon tree, etc.) to implement a persistent deduplication database, wherein entries are added to the persistent deduplication database, and potential deduplication candidates are naturally and efficiently identified over time as the write-optimized tree data structure is updated (e.g., segment merging in an LSM tree, batch message flushing between nodes in a B-epsilon tree) and entries with matching keys (e.g., matching signatures) are identified as potential deduplication candidates. This late identification works very well for non-dedupable workloads (e.g., large number of I/O writes have different signatures), where other post-process deduplication solutions fail to efficiently avoid excessive processing due to the inefficiency of caching approaches in this context.

In addition, the exemplary techniques disclosed herein avoid the need to create chains of pointers by including logical address information in the deduplication entries of the persistent deduplication database implemented by a write-optimized tree data structure. Moreover, this is done with minimal impact on the overall capacity consumption of the tree data structure since the logical address information is only needed as the entries propagate down the tree structure, but such logical address information is not needed at the lowest level (e.g., leaf nodes) of the tree data structure.

Figure 10:
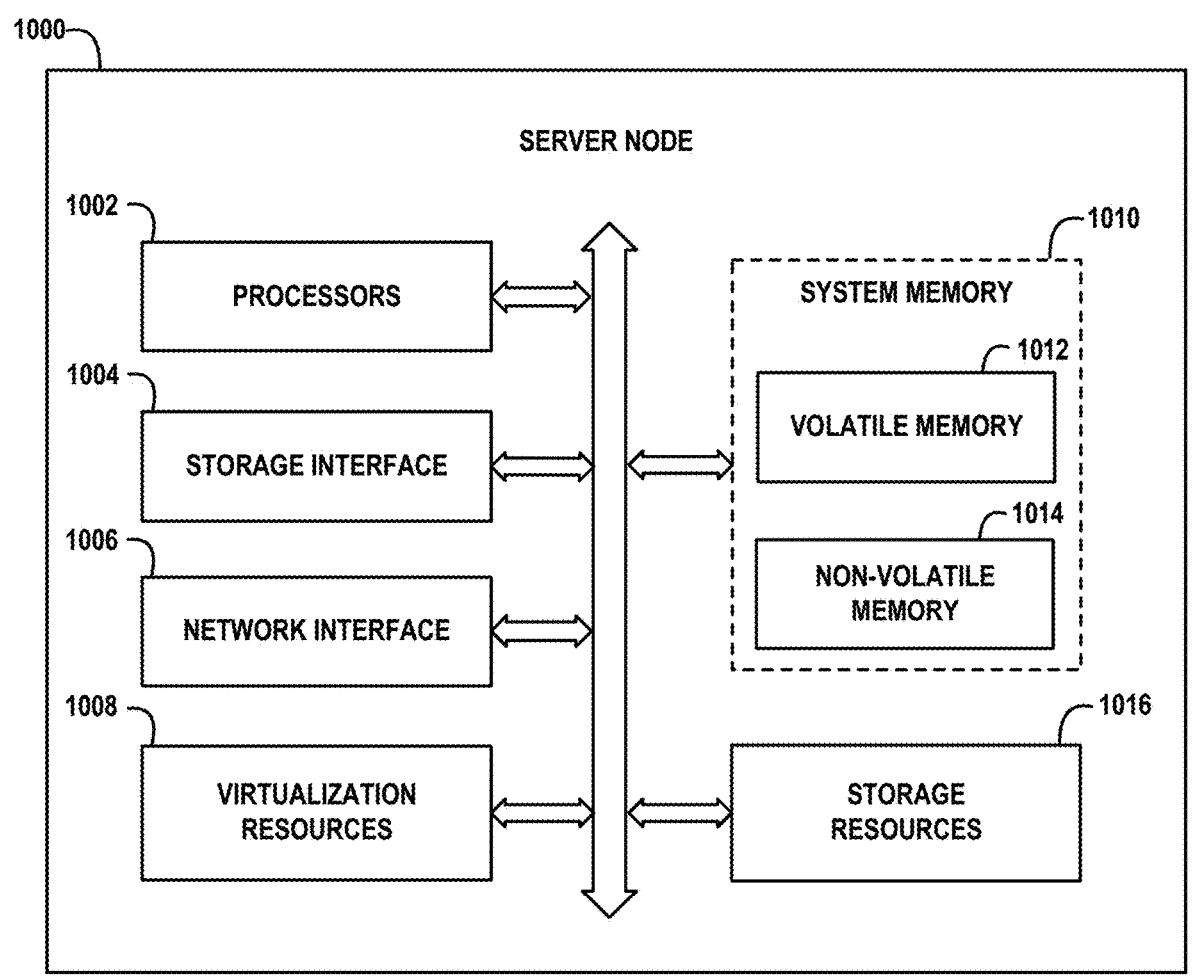
FIG. 10 schematically illustrates a framework of a server for hosting a storage control system which implements a data deduplication system node, according to an exemplary embodiment of the disclosure.

FIG. 10 schematically illustrates a framework of a server node 1000 for hosting a storage control system which implements a data deduplication system node, according to an exemplary embodiment of the disclosure. The server node 1000 comprises processors 1002, storage interface circuitry 1004, network interface circuitry 1006, virtualization resources 1008, system memory 1010, and storage resources 1016. The system memory 1010 comprises volatile memory 1012 and non-volatile memory 1014. The processors 1002 comprise one or more types of hardware processors that are configured to process program instructions and data to execute a native operating system (OS) and applications that run on the server node 1000.

For example, the processors 1002 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 1004 enables the processors 1002 to interface and communicate with the system memory 1010, the storage resources 1016, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 1006 enables the server node 1000 to interface and communicate with a network and other system components. The network interface circuitry 1006 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 1008 can be instantiated to execute one or more services or functions which are hosted by the server node 1000. For example, the virtualization resources 1008 can be configured to implement the various modules and functionalities of a data deduplication control system as discussed herein. In some embodiments, the virtualization resources 1008 comprise virtual machines that are implemented using a hypervisor platform which executes on the server node 1000, wherein one or more virtual machines can be instantiated to execute functions of the server node 1000. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1000, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 1008 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1000 as well execute one or more of the various modules and functionalities of a storage control node and a data deduplication control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage control systems and data deduplication control systems, and the deduplication processes discussed herein, are implemented using program code that is loaded into the system memory 1010 (e.g., volatile memory 1012), and executed by the processors 1002 to perform respective functions as described herein. In this regard, the system memory 1010, the storage resources 1016, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 1010 comprises various types of memory such as volatile RAM, NVRAM, or other types of memory, in any combination. The volatile memory 1012 may be a dynamic random-access memory (DRAM) (e.g., DRAM DIMM (Dual In-line Memory Module), or other forms of volatile RAM. The non-volatile memory 1014 may comprise one or more of NAND Flash storage devices, SSD devices, or other types of next generation non-volatile memory (NGNVM) devices. The system memory 1010 can be implemented using a hierarchical memory tier structure wherein the volatile memory 1012 is configured as the highest-level memory tier, and the non-volatile memory 1014 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 1002 to execute a native operating system and one or more applications or processes hosted by the server node 1000, and to temporarily store data that is utilized and/or generated by the native OS and application programs and processes running on the server node 1000. The storage resources 1016 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
receiving, by a storage control system, a first data block to be written to a primary storage;
generating, by the storage control system, a content signature for the first data block;
adding, by the storage control system, a first entry for the first data block into a persistent deduplication database, wherein the first entry for the first data block comprises a key which comprises the content signature for the first data block, and wherein the persistent deduplication database comprises a tree data structure which comprises elements that are configured to store entries for data blocks;
merging, by the storage control system, the entries of at least two elements of the tree data structure to generate a set of merged entries which comprises the first entry for the first data block;
determining, by the storage control system, whether the set of merged entries includes a second data block having a second entry with a key that matches the key of the first entry of the first data block; and
commencing, by the storage control system, a deduplication process to determine if the first entry and the second entry correspond to duplicate data blocks, in response to determining that the first entry and the second entry in the set of merged entries have matching keys.

2. The method of claim 1, wherein the tree data structure comprises a log-structured merge tree data structure, and wherein the elements comprise segments of the log-structured merge tree.

3. The method of claim 1, wherein the tree data structure comprises a B-epsilon tree data structure, and wherein the elements comprise message buffers of internal nodes of the B-epsilon tree data structure.

4. The method of claim 1, further comprising assigning, by the storage control system, a first virtual address for a logical address of the first data block, wherein the first entry further comprises the first virtual address and the logical address of the first data block, wherein the content signature and the first virtual address comprise a key:value pair for the first entry.

5. The method of claim 4, further comprising:
performing, by the storage control system, the deduplication process to determine whether the first data block comprises a same or similar content as the second data block; and
in response to determining that the first data block comprises the same or similar content as the second data block:
utilizing, by the storage control system, the logical address included in the first entry for the first data block, and a second virtual address included in the second entry for the second data block to update a logical-to-virtual pointer from the logical address of the first data block to the second virtual address included in the second entry for the second data block; and
incrementing, by the storage control system, a reference count for the second virtual address.

6. The method of claim 1, wherein generating the content signature for the first data block comprises generating a cryptographic hash value for content of the first data block.

7. The method of claim 1, further comprising:
writing, by the storage control system, the first data block to a persistent write cache;
returning, by the storage control system, an acknowledge message to indicate that the first data block is written to the primary storage, in response to the first data block being stored in the persistent write cache; and
destaging, by the storage control system, the first data block from the persistent write cache without writing the first data block to the primary storage, in response to the deduplication process validating that the first data block is a duplicate of existing data block in the primary storage.

8. The method of claim 1, further comprising:
searching, by the storage control system, a cached deduplication database to determine if the cached deduplication database comprises a cached entry having a content signature which matches the content signature of the first data block;
in response to the storage control system determining that there is no cached entry having a content signature which matches the content signature of the first data block, the storage control system adds the first entry for the first data block into the persistent deduplication database; and
in response to the storage control system identifying a given cached entry having a content signature which matches the content signature of the first data block, the storage control system performing an inline deduplication process to determine whether the first data block comprises a same or similar content as a third data block which is associated with the given cached entry.

9. An article of manufacture comprising a non-transitory processor-readable storage medium having stored therein program code of one or more software programs, wherein the program code is executable by one or more processors to implement a method which comprises:
receiving, by a storage control system, a first data block to be written to a primary storage;
generating, by the storage control system, a content signature for the first data block;
adding, by the storage control system, a first entry for the first data block into a persistent deduplication database, wherein the first entry for the first data block comprises a key which comprises the content signature for the first data block, and wherein the persistent deduplication database comprises a tree data structure which comprises elements that are configured to store entries for data blocks;
merging, by the storage control system, the entries of at least two elements of the tree data structure to generate a set of merged entries which comprises the first entry for the first data block;
determining, by the storage control system, whether the set of merged entries includes a second data block having a second entry with a key that matches the key of the first entry of the first data block; and
commencing, by the storage control system, a deduplication process to determine if the first entry and the second entry correspond to duplicate data blocks, in response to determining that the first entry and the second entry in the set of merged entries have matching keys.

10. The article of manufacture of claim 9, wherein the tree data structure comprises a log-structured merge tree data structure, and wherein the elements comprise segments of the log-structured merge tree.

11. The article of manufacture of claim 9, wherein the tree data structure comprises a B-epsilon tree data structure, and wherein the elements comprise message buffers of internal nodes of the B-epsilon tree data structure.

12. The article of manufacture of claim 9, further comprising program code which is executable by the one or more processors to implement a method which comprises assigning, by the storage control system, a first virtual address for a logical address of the first data block, wherein the first entry further comprises the first virtual address and the logical address of the first data block, wherein the content signature and the first virtual address comprise a key:value pair for the first entry.

13. The article of manufacture of claim 12, further comprising program code which is executable by the one or more processors to implement a method which comprises:
performing, by the storage control system, the deduplication process to determine whether the first data block comprises a same or similar content as the second data block; and
in response to determining that the first data block comprises the same or similar content as the second data block:
utilizing, by the storage control system, the logical address included in the first entry for the first data block, and a second virtual address included in the second entry for the second data block to update a logical-to-virtual pointer from the logical address of the first data block to the second virtual address included in the second entry for the second data block; and
incrementing, by the storage control system, a reference count for the second virtual address.

14. The article of manufacture of claim 9, further comprising program code which is executable by the one or more processors to implement a method which comprises:
writing, by the storage control system, the first data block to a persistent write cache;
returning, by the storage control system, an acknowledge message to indicate that the first data block is written to the primary storage, in response to the first data block being stored in the persistent write cache; and destaging, by the storage control system, the first data block from the persistent write cache without writing the first data block to the primary storage, in response to the deduplication process validating that the first data block is a duplicate of existing data block in the primary storage.

15. The article of manufacture of claim 9, further comprising program code which is executable by the one or more processors to implement a method which comprises:

searching, by the storage control system, a cached deduplication database to determine if the cached deduplication database comprises a cached entry having a content signature which matches the content signature of the first data block;

in response to the storage control system determining that there is no cached entry having a content signature which matches the content signature of the first data block, the storage control system adds the first entry for the first data block into the persistent deduplication database; and in response to the storage control system identifying a given cached entry having a content signature which matches the content signature of the first data block, the storage control system performing an inline deduplication process to determine whether the first data block comprises a same or similar content as a third data block which is associated with the given cached entry.

16. An apparatus, comprising:

at least one processor; and memory configured to store program code, wherein the program code is executable by the at least one processor to instantiate a storage control system, wherein the storage control system is configured to:

receive a first data block to be written to a primary storage;

generate a content signature for the first data block;

add a first entry for the first data block into a persistent deduplication database, wherein the first entry for the first data block comprises a key which comprises the content signature for the first data block, and wherein the persistent deduplication database comprises a tree data structure which comprises elements that are configured to store entries for data blocks;

merge the entries of at least two elements of the tree data structure to generate a set of merged entries which comprises the first entry for the first data block;

determine whether the set of merged entries includes a second data block having a second entry with a key that matches the key of the first entry of the first data block; and commence a deduplication process to determine if the first entry and the second entry correspond to duplicate data blocks, in response to determining that the first entry and the second entry in the set of merged entries have matching keys.

17. The apparatus of claim 16, wherein tree data structure comprises one of (i) a log-structured merge tree data structure, and wherein the elements comprise segments of the log-structured merge tree, an (ii) a B-epsilon tree data structure, and wherein the elements comprise message buffers of internal nodes of the B-epsilon tree data structure.

18. The apparatus of claim 16, wherein the storage control system is configured to:

assign a first virtual address for a logical address of the first data block, wherein the first entry further comprises the first virtual address and the logical address of the first data block, wherein the content signature and the first virtual address comprise a key:value pair for the first entry;

perform the deduplication process to determine whether the first data block comprises a same or similar content as the second data block; and in response to determining that the first data block comprises the same or similar content as the second data block:

utilize the logical address included in the first entry for the first data block, and a second virtual address included in the second entry for the second data block to update a logical-to-virtual pointer from the logical address of the first data block to the second virtual address included in the second entry for the second data block; and increment a reference count for the second virtual address.

19. The apparatus of claim 16, wherein the storage control system is configured to:

write the first data block to a persistent write cache;

return an acknowledge message to indicate that the first data block is written to the primary storage, in response to the first data block being stored in the persistent write cache; and destage the first data block from the persistent write cache without writing the first data block to the primary storage, in response to the deduplication process validating that the first data block is a duplicate of existing data block in the primary storage.

20. The apparatus of claim 16, wherein the storage control system is configured to:

search a cached deduplication database to determine if the cached deduplication database comprises a cached entry having a content signature which matches the content signature of the first data block;

in response to determining that there is no cached entry having a content signature which matches the content signature of the first data block, the first entry for the first data block is added into the persistent deduplication database; and in response to identifying a given cached entry having a content signature which matches the content signature of the first data block, perform an inline deduplication process to determine whether the first data block comprises a same or similar content as a third data block which is associated with the given cached entry.

* * * * *